United States Patent [19]
Arnold et al.

[11] Patent Number: 6,038,052
[45] Date of Patent: Mar. 14, 2000

[54] COMPACT DOCUMENT SCANNER

[75] Inventors: Stephen C. Arnold, Honeoye Falls; Robert E. Ashe, Henrietta; R. Winfield Trafton; Thomas D. Jensen, both of Holley, all of N.Y.

[73] Assignee: Eastman Kodak Company, Rochester, N.Y.

[21] Appl. No.: 09/083,461

[22] Filed: May 22, 1998

[51] Int. Cl.$^7$ .................................................. G02B 26/08
[52] U.S. Cl. .......................... 359/205; 358/474; 358/483; 358/496
[58] Field of Search .................................... 359/196–226, 359/364, 726–728, 732–736; 358/474, 482, 483, 493, 494, 496, 497; 399/201–202

[56] References Cited

U.S. PATENT DOCUMENTS 4,812,917   3/1989   Suzuki ..................................... 358/494

Primary Examiner—James Phan
Attorney, Agent, or Firm—Svetlana Z. Short

[57] ABSTRACT

A document scanner includes: a document support for supporting a document in position to be scanned; an illumination system located adjacent to the document support for illuminating at least a portion of a supported document; a photosensitive medium for capturing an image of the document and generating image information; and a retroreflective imaging lens having an F-number between F/3 and F/8. The retroreflective lens comprises at least one lens element with optical power and a reflective surface, and is positioned to (i) receive light emanating from the document and propagated it in a first direction, through the retroreflective lens, (ii) reflect the light off said reflective surface in a second direction, and (iii) propagate the light through the retroreflective lens in the second direction, towards the photosensitive medium. The document support, the photosensitive medium, and the retroreflective lens are in a fixed spatial relationship relative to one another. According to one embodiment of the present invention the illumination system provides less than 1 watt of power.

14 Claims, 23 Drawing Sheets

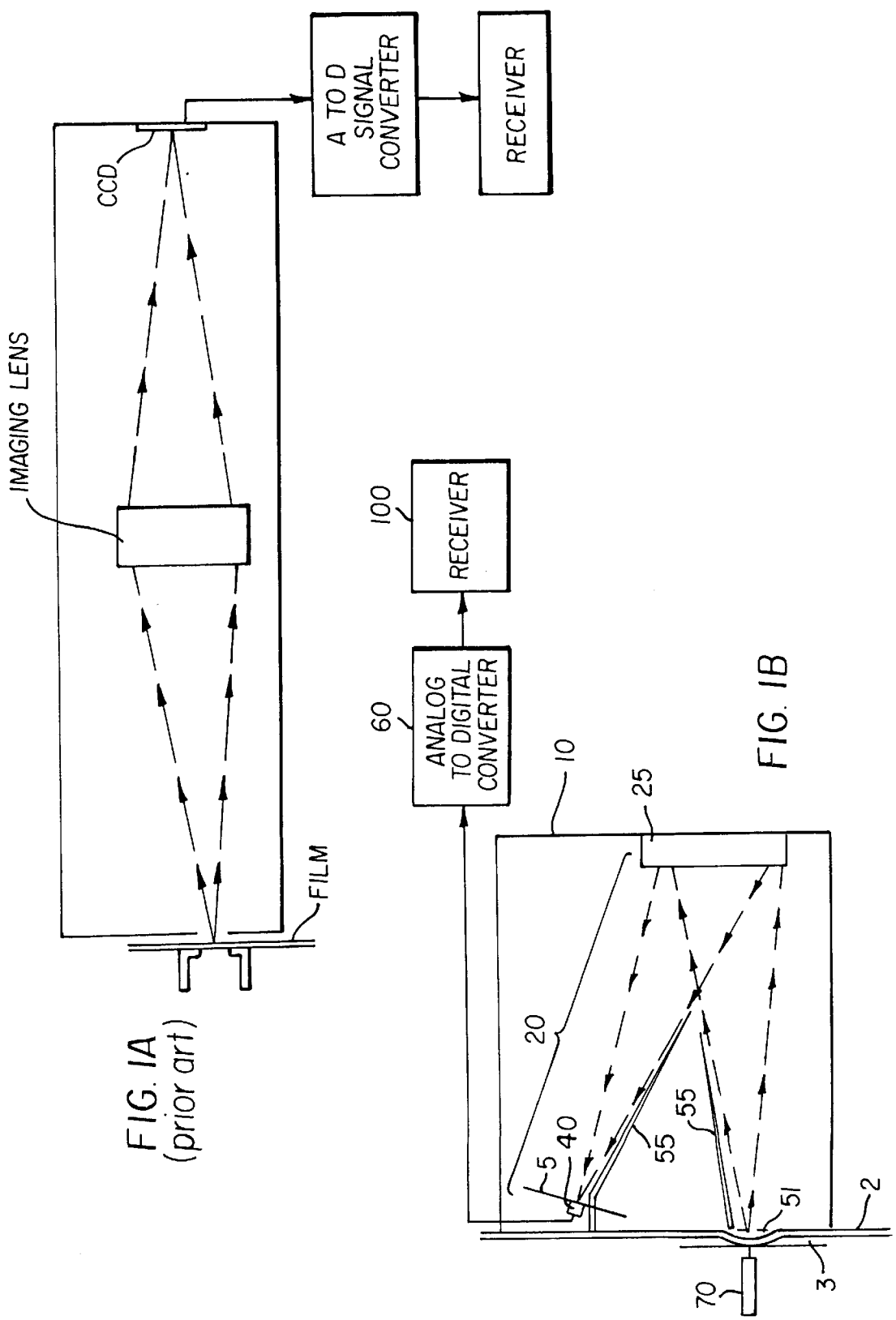

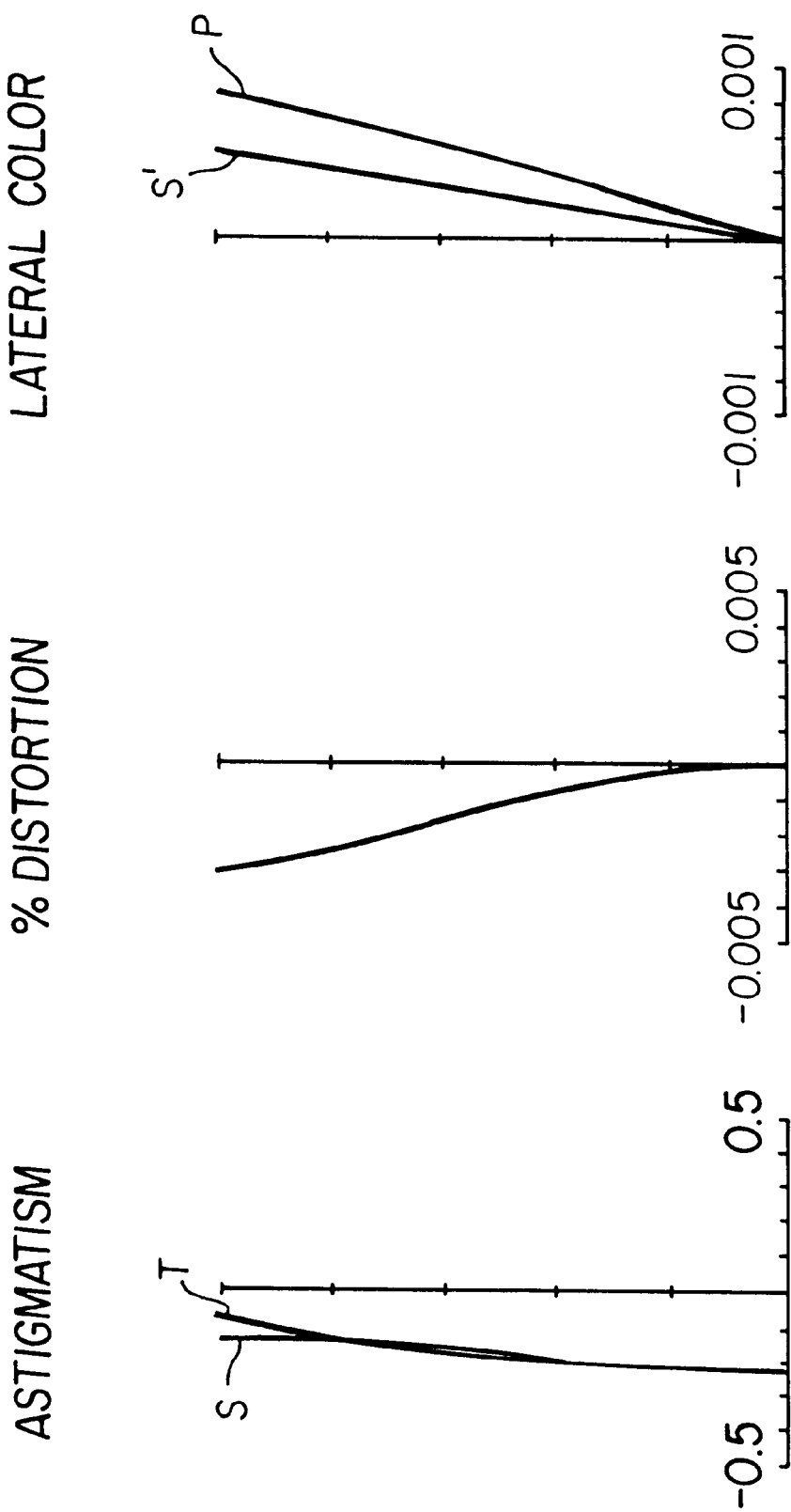

AXIS (0% FIELD)
15% FIELD
25% FIELD
30% FIELD

60% FIELD
70% FIELD
9% FIELD
100% FIELD

COMPACT DOCUMENT SCANNER

CROSS REFERENCE TO RELATED APPLICATIONS

Cross reference is made to commonly assigned, copending U.S. applications Ser. No. 09/083,604, filed May 22, 1998 and entitled "IMAGING APPARATUS FOR A PHOTOGRAPHIC FILM IMAGE SCANNER", U.S. Ser. No. 09/084,062, filed May 22, 1998 and entitled "ILLUMINANT HEAD ASSEMBLY FOR FILM IMAGE SCANNER", U.S. Ser. No. 09/083,359, filed May 22, 1998 and entitled "ULTRAVIOLET CURABLE RIVETING OF PRECISION ALIGNED COMPONENTS", U.S. Ser. No. 09/083,461, filed May 22, 1998 and entitled "A COMPACT DOCUMENT SCANNER", and U.S. Ser. No. 09/083,460, filed May 22, 1998 and entitled "A RETROREFLECTIVE LENS".

FIELD OF THE INVENTION

This invention relates to a document scanner, and more particularly to an imaging system of a document scanner, where the scanner is capable of scanning film or other documents and generating a digitized image.

BACKGROUND OF THE INVENTION

I. Document scanners utilizing linear Charge Coupled Devices (CCDs) are known. In a single color linear document scanner, the document, such as film, is scanned one line at a time onto the single array of CCD elements. Trilinear CCD comprises three CCD arrays (for example, one for red, one for green, and one for blue wavelengths) in order to achieve color imaging. These document scanners employ a fixed position single-pass imaging lens to image the document onto the CCD array, such that the object and image planes lie on opposite sides of the imaging lens if folding mirrors are not used. By single-pass imaging lens we mean that the light rays can pass through the imaging lens only once. This renders the imaging system of the document scanner quite long ($\approx$100 mm, for example). Such document scanner is shown schematically in FIG. 1A.

In addition, in order to properly scan a document, such as film, on a photosensitive medium such as a CCD, the imaging system of the document scanner has a very high resolution (typically, about 50 to 200 cycles/mm). The high resolution requirement corresponds to a small depth of focus of the imaging lens. Therefore, in order to establish a stable optical performance, it is necessary to maintain the object plane, the image plane, and the imaging lens in precise and rigid mechanical relationship with one another. This assures a well-focused image that is of the proper magnification, and without image distortion caused by rotation of either the document or the CCD during the scanning process. This mechanical rigidity is achieved by a housing that holds the imaging lens, the document (film, for example) and the CCD in proper spatial relationship with one another. This mechanical rigidity is difficult to achieve at reasonable cost because the tolerances on stability of the document, CCD and the imaging lens must be very tight ($\pm 10$ $\mu$m). Many manufacturers build their systems out of many separate parts. As a result, the combination of tolerances on the housing parts require tight control of manufacturing processes, making the housing expensive to produce.

Furthermore, the housing is usually mounted to a base that provides necessary mounting for other components of the document scanner. As described above, the imaging system (from the document support to the CCD array) of such document scanners is relatively long. The length of the imaging system causes it to be susceptible to misalignment due to mechanical stresses induced by the base mechanical structure, thermal excursions and humidity variations. In addition, when the mounting components for the imaging lens and the CCD array are molded out of plastic, mechanical distortions (warping) of the mounting components are introduced during cooling of the molded components. These distortions can cause misalignment of the imaging lens, CCD, and document with respect to one another, causing image degradation.

In addition, the assembly of the imaging system is time consuming and expensive for the following reasons.

The fabrication of imaging lenses results in some variation of focal length among the imaging lenses. This results in the image being out of focus. The imaging lenses may also introduce erroneous tilt of the image plane relative to the object plane. These changes must be compensated during the assembly of the imaging system through adjustment of the object to the image plane distance (by shifting the CCD towards or away from the object plane), and tilt of the CCD. The CCD array(s) must be rotated to a position such that the line of CCD elements is perpendicular to the motion of the document in order to avoid skewing of the resultant image. The location of the center of the CCD array and the center of the scanned line of the document must be located on or close to the optical axis of the imaging lens. Thus, it is necessary to be able to move the imaging lens along the optical axis, and adjust the position of the CCD array in as many as 5 different ways (three directions—x, y, z and two tilt angles $\theta$x, $\theta$y). Further, the change in the focal length of the imaging lens results in a magnification change. This magnification change needs to be corrected or minimized by moving the imaging lens along its optical axis with respect to the object plane. When this magnification change is compensated for by this axial displacement of the imaging lens, the image is no longer focused on the CCD. Thus the CCD needs to be moved again to provide a sharp image on the CCD. This in turn creates a change in magnification. The process of moving the imaging lens and moving the CCD is repeated over and over again until both the required magnification and a relatively sharp image on the CCD array are obtained. Thus, the assembly of the imaging system requires simultaneous adjustment for best focus and magnification, and the adjustment process is iterative. Since both imaging lens and CCD must be moved, the time required for the iterations is an important consideration in a high volume alignment environment. The iterative process and the number of adjustments required to assemble a document scanner of this type is lengthy and expensive.

SUMMARY OF INVENTION

According to one aspect of the present invention, a document scanner includes:

a document support for supporting a document in position to be scanned; an illumination system located adjacent to the document support for illuminating at least a portion of a supported document; a photosensitive medium for capturing an image of the document and generating image information; and a retroreflective imaging lens having an F-number between F/3 and F/8. The retroreflective lens comprises at least one lens element with optical power and a reflective surface, and is positioned to (i) receive light emanating from the document and propagate it in a first direction, through the retroreflective lens, (ii) reflect the light off said reflective surface in a second direction, and (iii) propagate the light through the retroreflective lens in the second direction, towards the photosensitive medium. The document support, the photosensitive medium, and the retroreflective lens are in a fixed spatial relationship relative to one another.

According to another aspect of the present invention, a document scanner includes (i) a housing with a document positioning feature supporting a document in position to be scanned, and other positioning features, the document positioning feature and the other positioning features being integral with the housing; (ii) an illumination system located adjacent to the document positioning feature for illuminating at least a portion of a supported document; (iii) a photosensitive medium for capturing an image of the supported document and generating image information, the photosensitive medium being mounted on at least one of the other positioning features; and (iv) a retroreflective lens for imaging the illuminated portion of the supported document onto the photosensitive medium. The retroreflective lens comprises at least one lens element with optical power and a reflective surface, and is positioned to (i) receive light emanating from the document, propagate it in a first direction, through the retroreflective lens, (ii) reflect the light off the reflective surface in a second direction and (iii) propagate the light through the retroreflective lens in the second direction towards the photosensitive medium. According to one embodiment of the present invention document positioning feature and other positioning features are molded integrally with the housing.

According to one embodiment of the present invention the illumination system provides less than 1 watt of power.

BRIEF DESCRIPTION OF THE FIGURES

FIG. 1A schematically illustrates a prior art document scanner.

FIG. 1B schematically illustrates an embodiment of a document scanner.

FIG. 10D is a plot of the field curves of the imaging lens of FIG. 9B.

FIG. 10E is a plot of the distortion of the imaging lens of FIG. 9B.

FIG. 10F is a plot of the lateral color of the imaging lens of FIG. 9B.

DETAILED DESCRIPTION OF EMBODIMENTS

Document Scanner

Figure 1C:
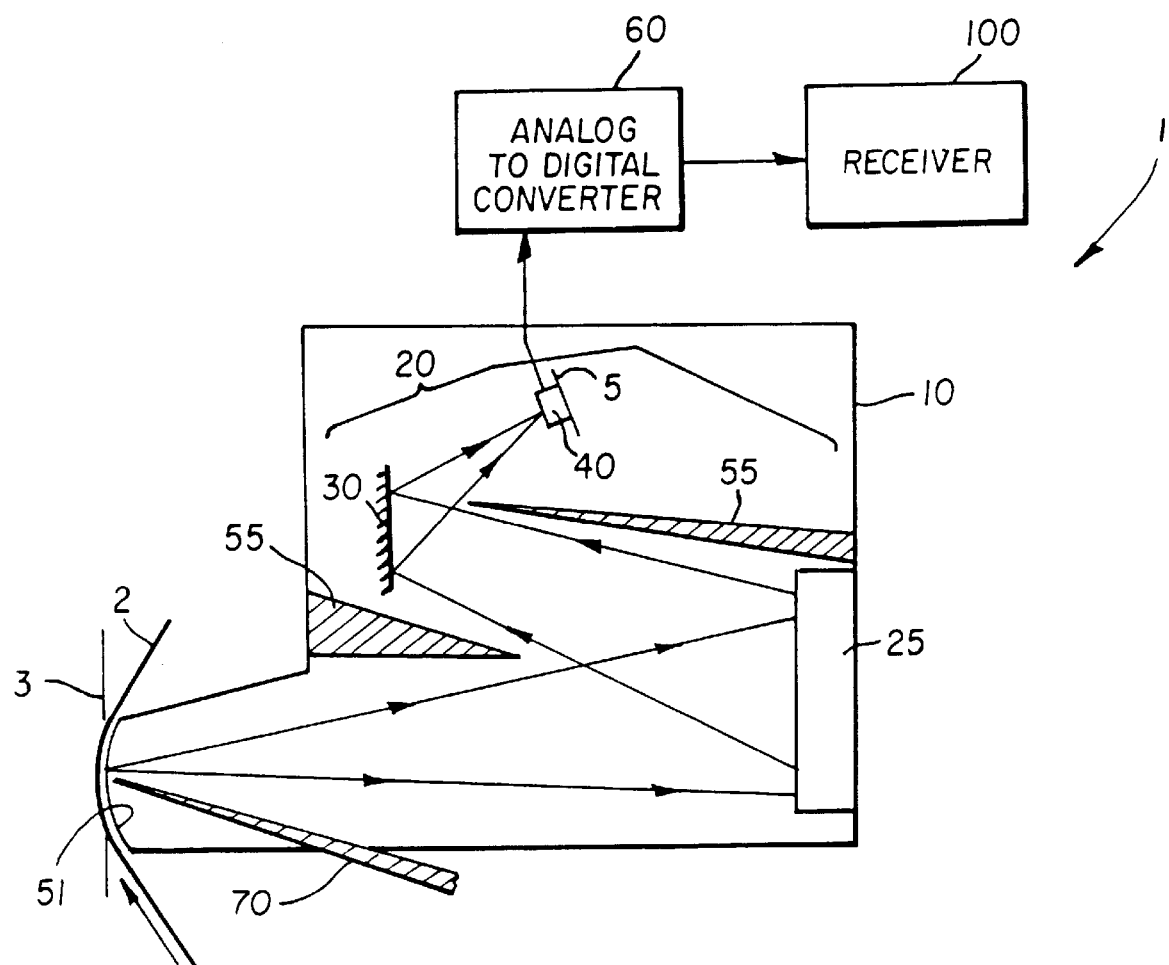
FIG. 1C schematically illustrates another embodiment of the document scanner.

A document scanner 1 for imaging a document 2 (at least partially located on an object plane 3) onto an image plane 5 is shown in FIGS. 1B and 1C. The term document is defined to include film, paper or another hard medium bearing viewable information.

The document scanner 1 includes a housing 10 and an imaging system 20 contained in the housing 10. The housing 10 is a light tight container for the imaging system 20. The imaging system 20 includes an imaging lens 25, and a photosensitive medium such as CCD 40. Optional folding mirrors 30 may be included between the imaging lens 25 and the CCD 40, or elsewhere in the imaging system. The housing 10 also includes positioning features 51 for providing proper positioning and support for the document 2, positioning features 52 and 53 (not shown) for positioning and supporting the imaging system components, and baffles 55. The positioning features are preferably formed integral to the housing 10. They will be discussed in detail later on in the specification.

The document 2, film for example, is moved across the object plane 3 and is imaged (one line at a time) by the imaging lens 25 onto an image plane 5, preferably occupied by a trilinear (color) CCD 40. The length of the CCD 40 is sufficient to capture the width of the image on the document 2, and the document 2 is advanced relative to the document scanner 1 in a direction other than parallel (preferably perpendicular) to the length of the CCD, while the CCD successively captures document image data row after row. In so doing, a two dimensional image of the document is acquired. The document scanner also includes a processor for transferring the image information from the photosensitive medium to a receiver. The processor includes an analog to digital converter 60. The analog signal generated by the CCD 40 is processed and converted to digital data representing the image. The digital image data can be stored or converted back to an analog image for display as needed.

Figure 2:
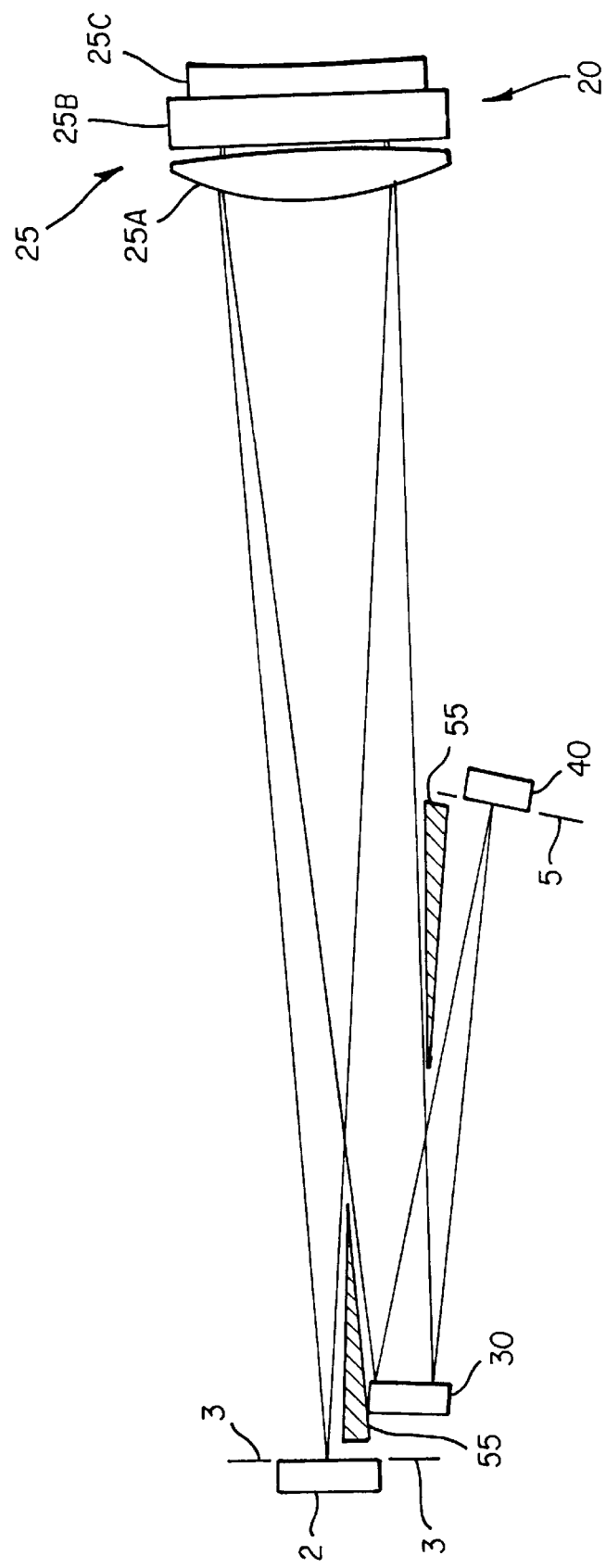
FIG. 2 is a side view of the first embodiment of the imaging system of the document scanner. This figure also shows a plurality of baffles.
Figure 3:
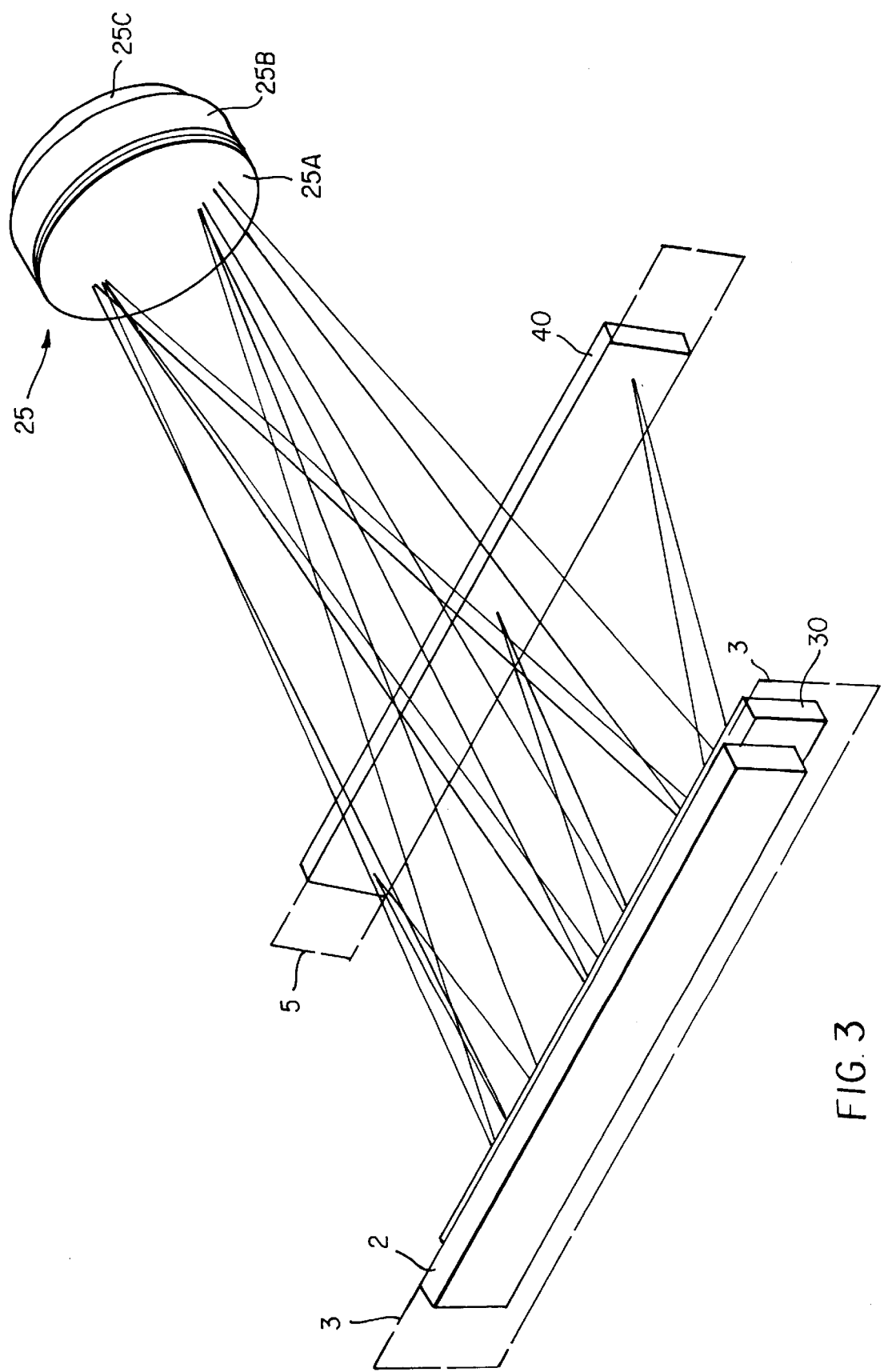
FIG. 3 is perspective view of the imaging system of FIG. 2, but without the baffles.
Figure 4:
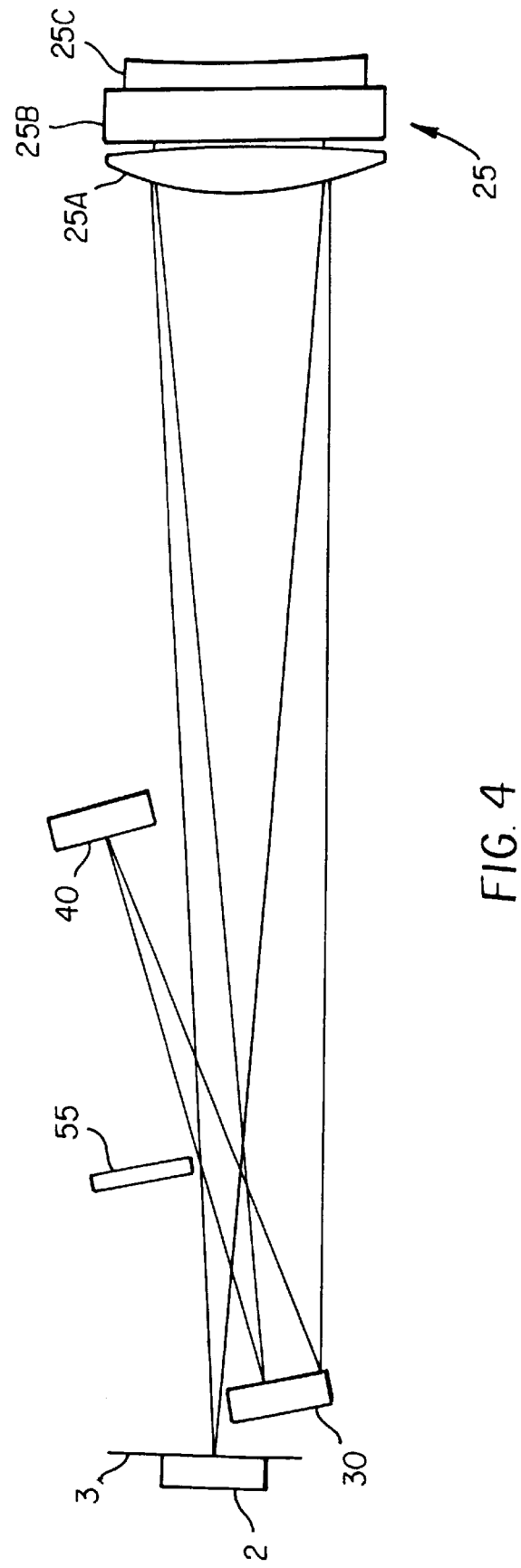
FIG. 4 is a side view of the second embodiment of the imaging system of the document scanner. This figure also shows a baffle located between the document and a CCD.
Figure 5:
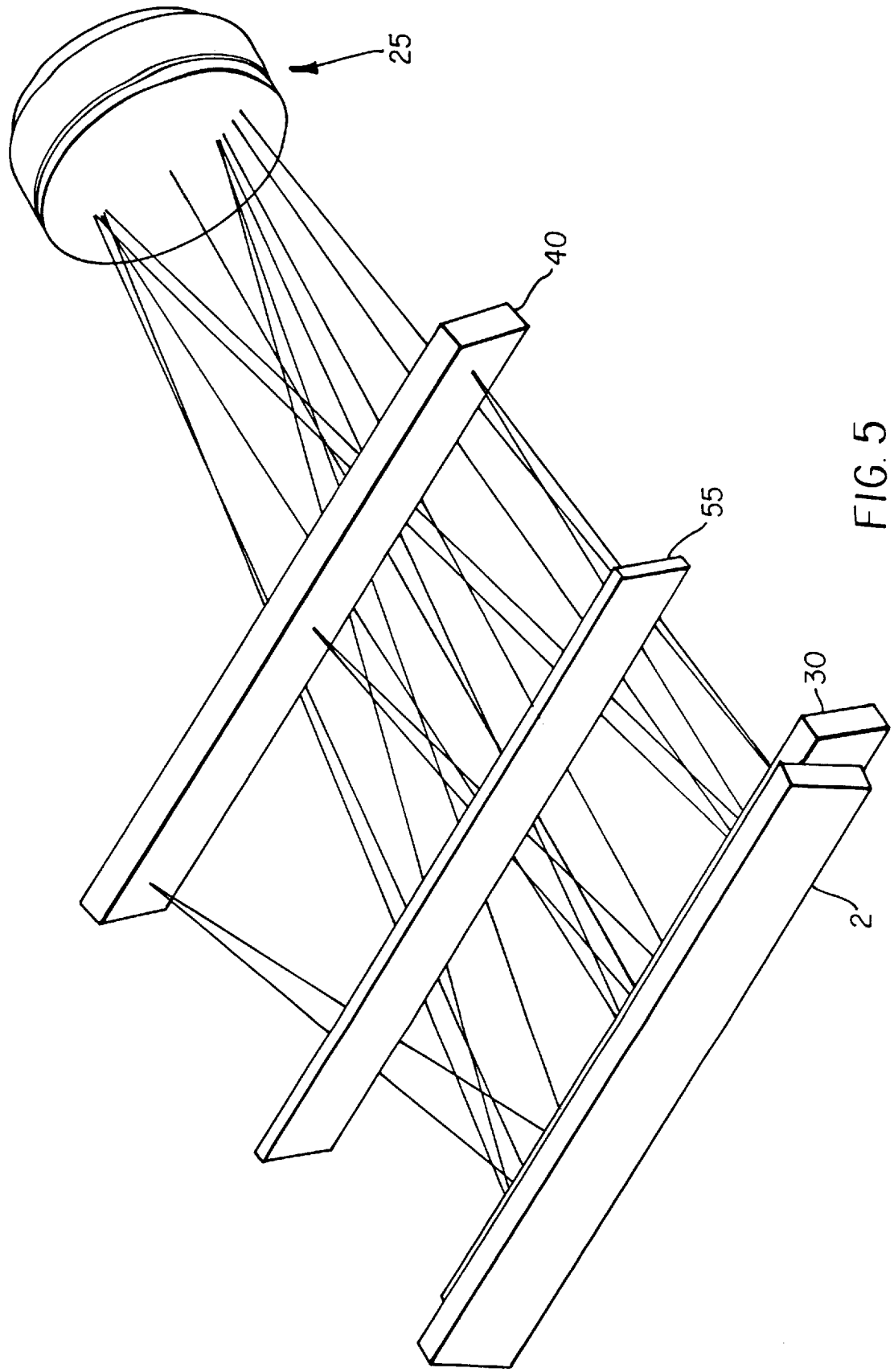
FIG. 5 is a perspective view of the imaging system of FIG. 4.
Figure 6:
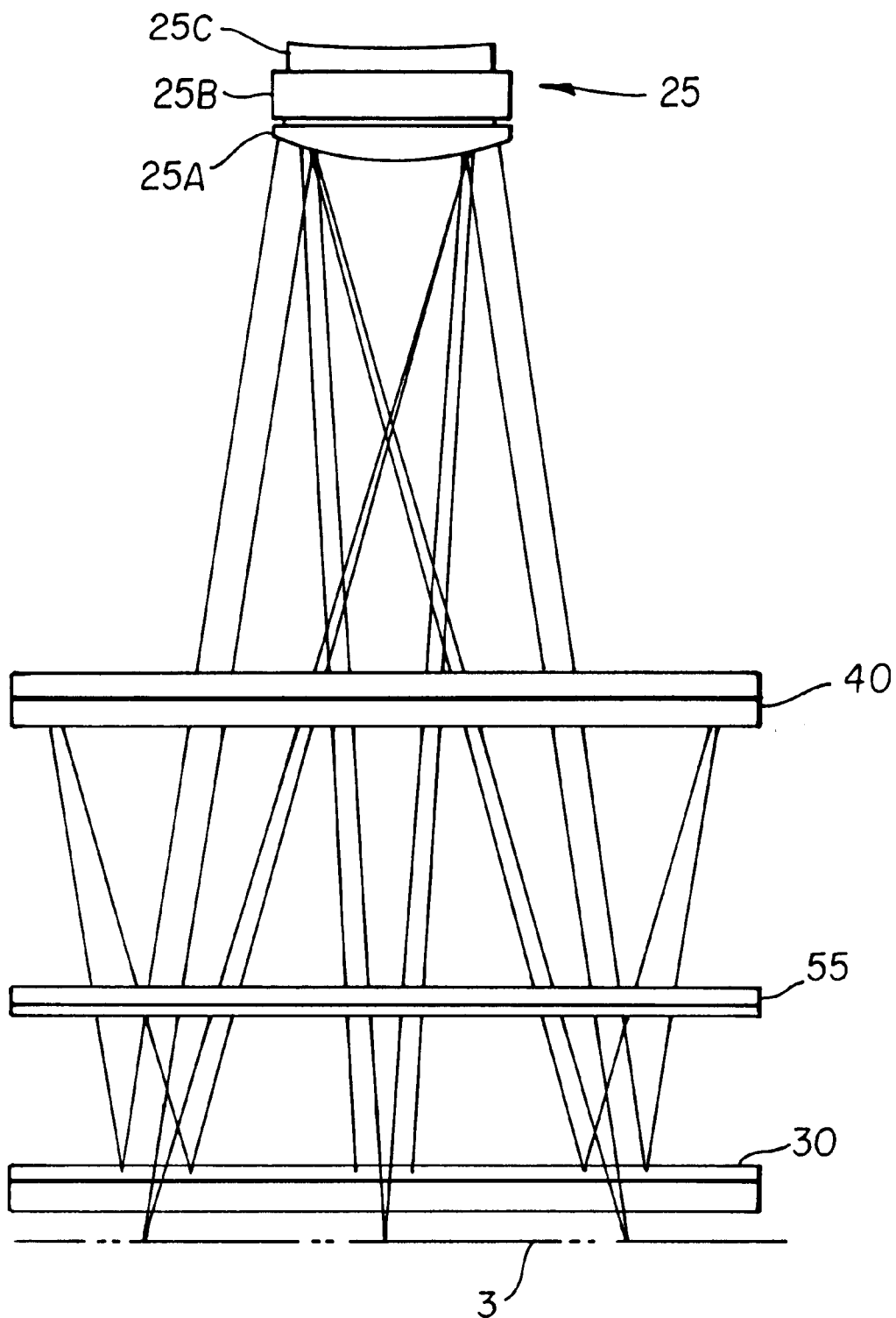
FIG. 6 is a top view of the imaging system of FIG. 4.
Figure 7:
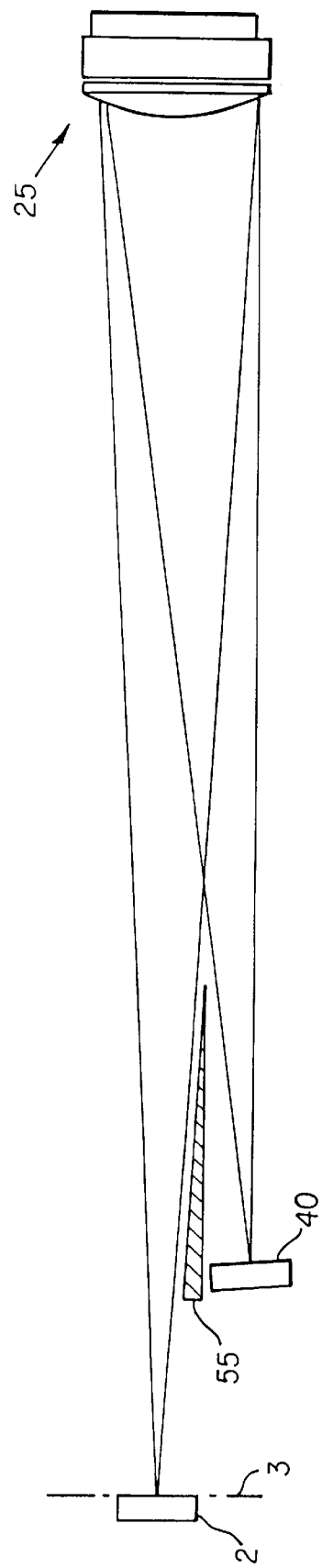
FIG. 7 is a side view of the third embodiment of the imaging system of the document scanner. This figure also shows a baffle shielding the CCD.
Figure 8:
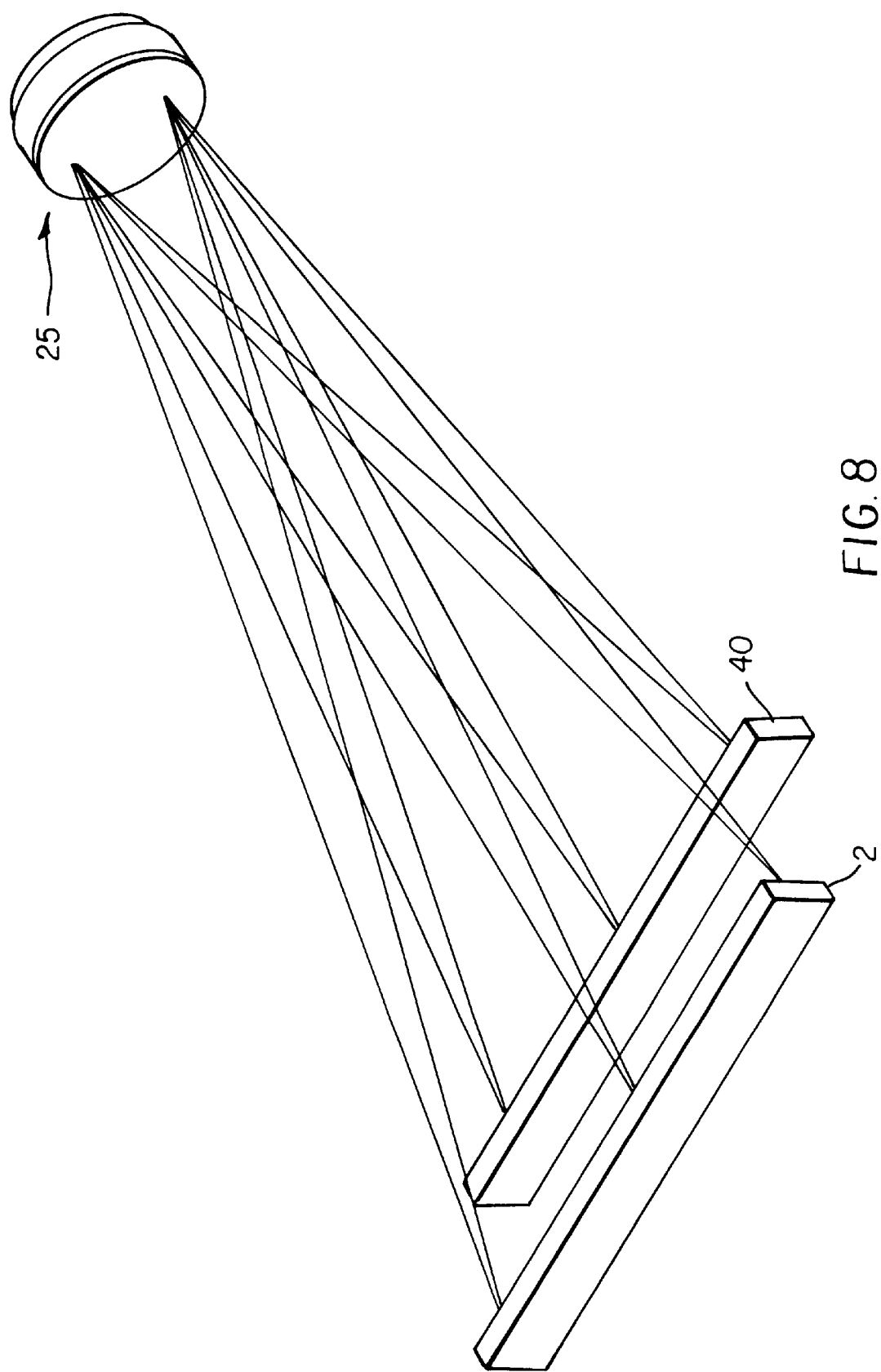
FIG. 8 is perspective view of the imaging system of FIG. 7, but without the baffle.

Three embodiments of the imaging system 20 are shown in FIGS. 2–8. More specifically, FIGS. 2 and 3 correspond to a first embodiment of the imaging system. FIGS. 4–6 correspond to a second embodiment of the imaging system 20. FIGS. 7 and 8 correspond to a third embodiment of the imaging system 20. It is preferred that the imaging systems have a magnification M with an absolute value of about one ($\cong 1$). The absolute value of the magnification of the first two embodiments is slightly greater than one ($|M|=1.1$), while in the third embodiment it is slightly smaller than one ($|M|=0.9$). The imaging systems 20 of the three embodiments depicted in FIGS. 2–8 utilize the same imaging lens 25. The light from the object plane 3 passes through the imaging lens 25 twice before the light strikes the CCD 40. The distances between the object plane 3, the image plane 5, and the imaging lens 25 are fixed. Depending on a specific configuration and constraints on a special envelope within the housing 10, the imaging system 20 may or may not utilize one or more folding mirrors. The first and the second embodiments of the imaging system utilize a folding mirror 30, while the third embodiment does not. Such folding mirrors can be placed between the object plane and the imaging lens and/or the imaging lens and the image plane in order to fold the imaging system 20 so as to make it more compact. (see FIGS. 2–6). The three embodiments depicted in FIGS. 2, 4, and 7 illustrate that different baffle configurations may be used to shield the CCD from the spurious (i.e. unwanted,) light. Spurious light is discussed in the "Baffles" section of the specification.

Imaging Lens

Figure 9A:
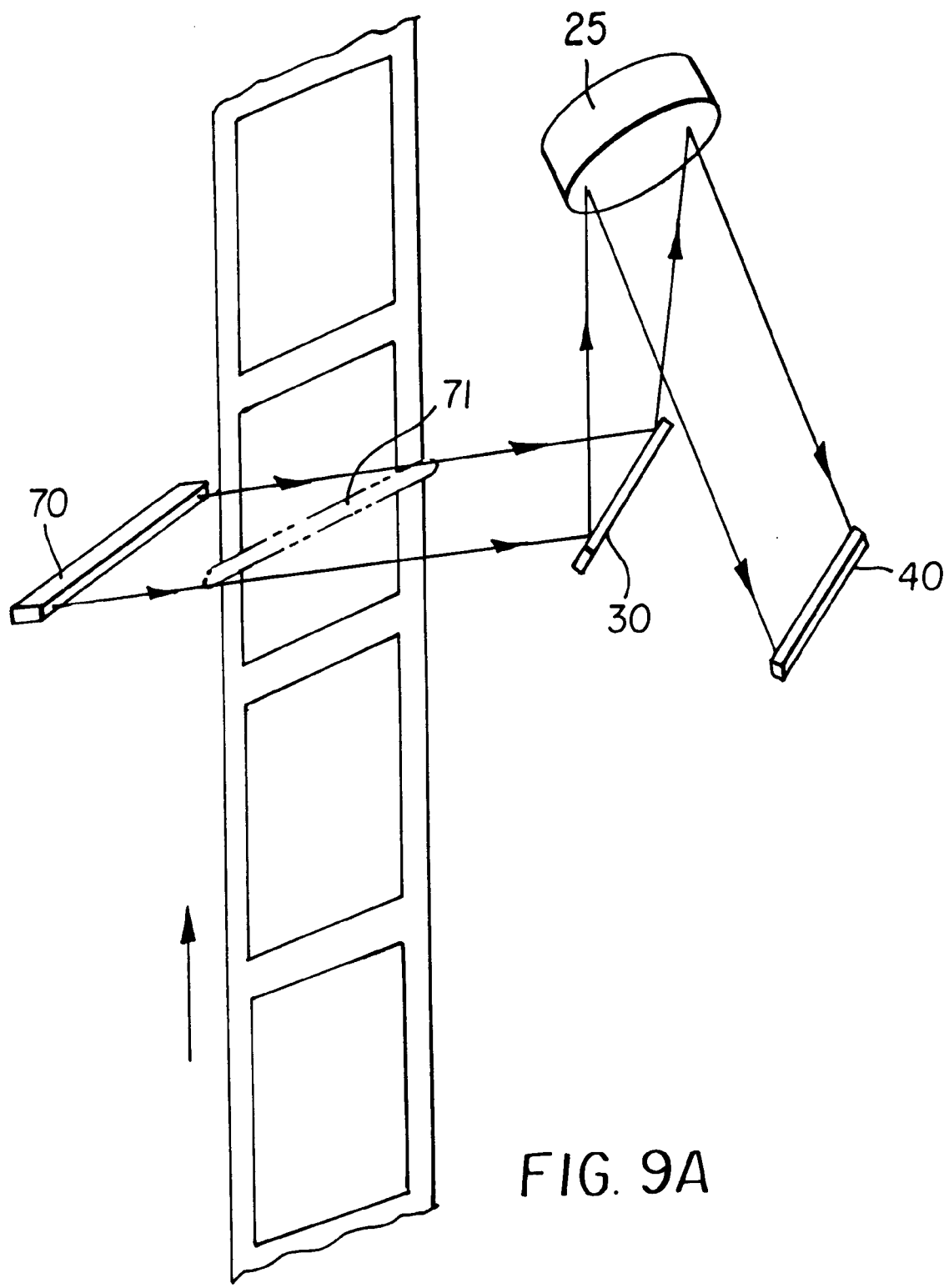
FIG. 9A illustrates an illuminated document and an imaging system.
Figure 9B:
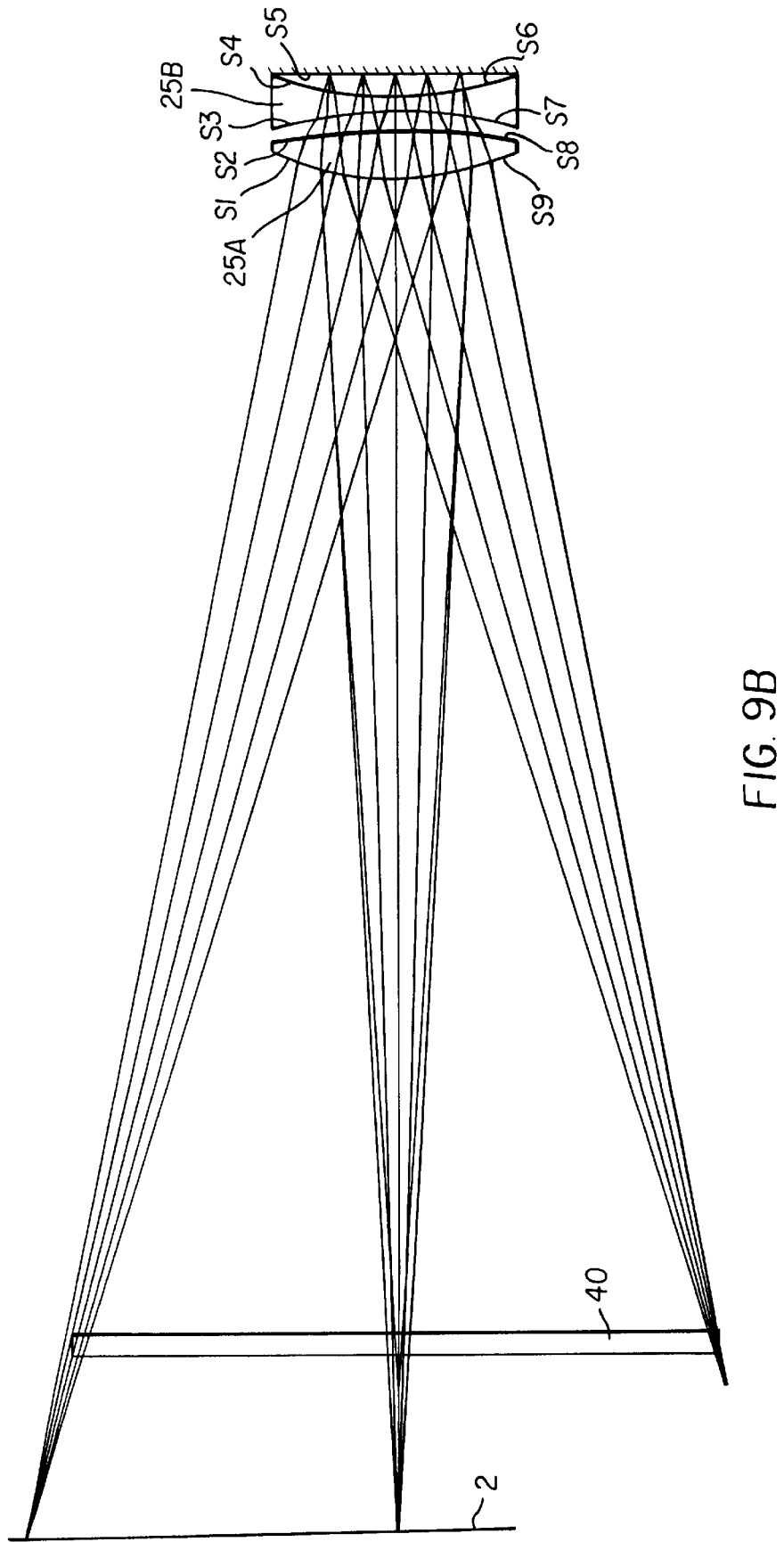
FIG. 9B depicts imaging lens of the imaging systems shown in FIGS. 2–8, with light rays traversing through the imaging lens.
Figure 9C:
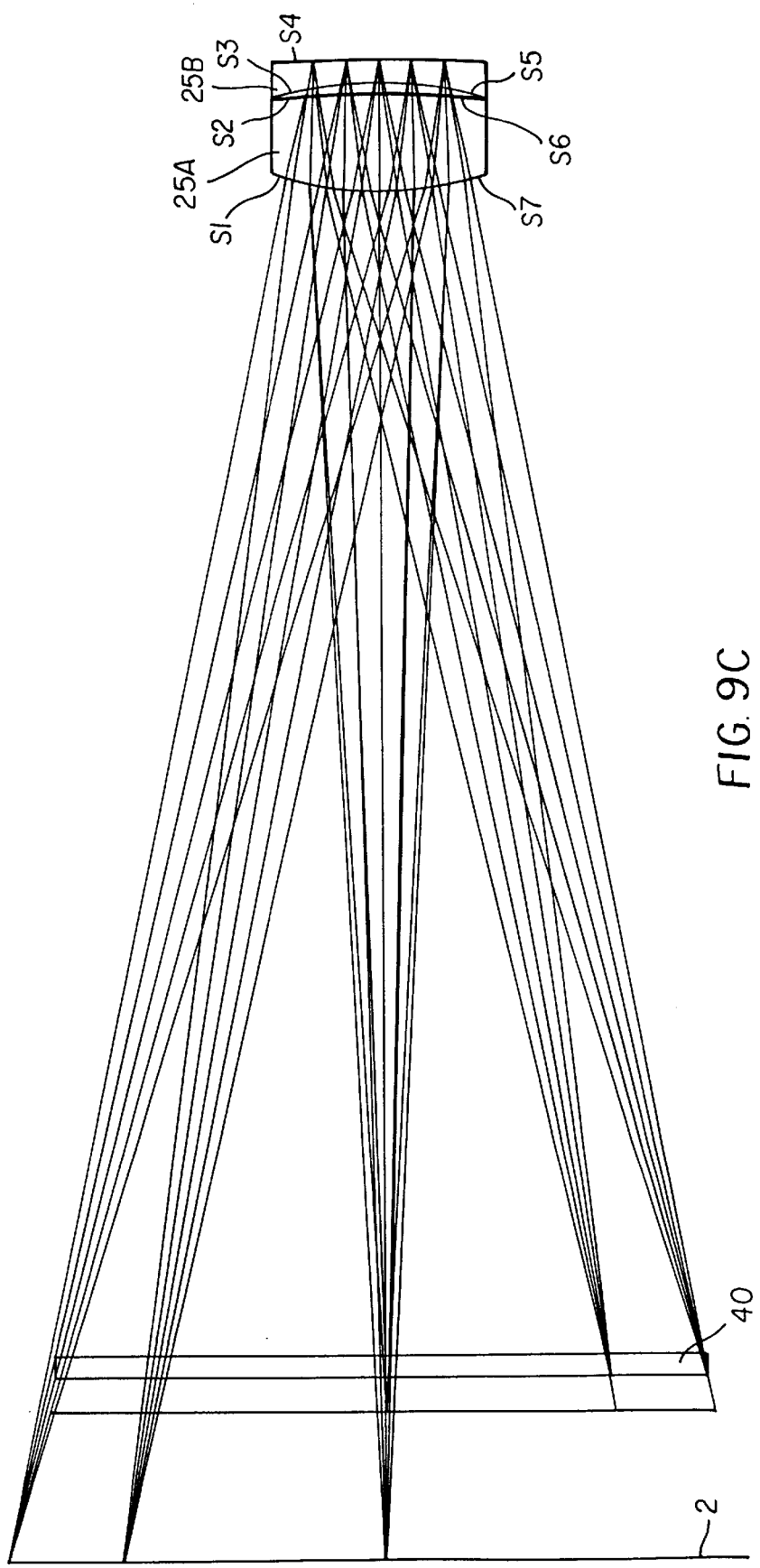
FIG. 9C depicts another example of an imaging lens.

Referring again to FIGS. 1B and 1C, the document 2 is illuminated either in transmission or reflection by an illumination system 70. According to this embodiment the illumination system 70 provides less than 1 watt of power. It is preferred, for reasons of cost and efficiency, that the illumination system provides less than 0.5 watts of power. It is preferred that a narrow line 71 of the document plane is illuminated during the scanning process, such that the long dimension of the line 71 is perpendicular to the length of the document 2. (See FIG. 9A). Light from the illuminated document 2 propagates toward the imaging lens 25. The imaging lens 25 is a retroreflective lens. One embodiment of this lens includes two lens elements 25A, 25B and a reflective surface 25C. This embodiment is depicted in FIG. 9B. Another embodiment of the retroreflective lens is shown in FIG. 9C. The retroreflective lens 25 intercepts and refracts the light directing it through lens elements 25A, 25B toward the reflective surface 25C. An aperture stop ST of the retroreflective lens 25 is located at or near the reflective surface 25C. Upon reflection from the reflective surface, the light once again traverses the same set of lens elements 25B and 25A in a generally opposite direction from the entering direction. Finally, the light is focused by these lens elements 25A and 25B upon the image plane 5, occupied by a photosensitive medium, preferably a CCD 40. The reflective surface can be a plano mirror as shown in FIG. 9B. Alternatively the reflective surface can be incorporated on the rear surface of the second lens element, 25B, so that it is curved, as shown in FIG. 9C.

As can be seen from the FIGS. 9B and 9C, lens element 25A is a biconvex lens element. Lens element 25B is a biconcave or meniscus lens element. The focal length of the retroreflective lens 25 is 22.4 mm or millimeters, and its total length (including the distance from lens element 25B to the reflective surface 25C) is less than 0.2 times the focal length of the retroreflective lens. It is preferred that the total length of the imaging lens be less than 0.15 times its focal length. The infinity F-number (F/#) of the retroreflective lens 25 is F/4.26 and its magnification (M) is –0.9. (The negative sign indicates an inversion of the image relative to the object.) The specific parameters for the retroreflective lens shown in FIG. 9B are provided in Table 1. The specific parameters for the retroreflective lens shown in FIG. 9C are provided in Table 2. In these tables the radii of curvature, air spaces and thicknesses of the lens elements are provided in millimeters. Nd stands for the index of refraction and V stands for the Abbe V number.

TABLE 1

| SRF | RADIUS | THICKNESS | MATERIAL | Nd | V |
|---|---|---|---|---|---|
| OBJ | | 43.960521 | AIR | | |
| S1 | 9.600234 | 1.561812 | LASFN30 | 1.808 | 40.8 |
| S2 | −28.780036 | 0.670771 | AIR | | |
| S3 | −13.466258 | 0.520604 | SF2 | 1.648 | 33.9 |
| S4 | 13.145601 | 0.702812 | AIR | | |
| ST, S5 | | −0.702812 | REFL | | |
| S6 | 13.145601 | −0.520604 | SF2 | 1.648 | 33.9 |
| S7 | −13.466258 | −0.670771 | AIR | | |
| S8 | −28.780036 | −1.561812 | LASFN30 | 1.808 | 40.8 |
| S9 | 9.600234 | −37.492858 | AIR | | |
| S10 | | −0.700000 | S-NSL5 (O'Hara)* | 1.525 | 59.8 |
| S11 | | −1.090000 | AIR | | |

*LENS DATA

It is noted that surfaces S6–S9 are identical to surfaces S1–S4, except that they occur in reverse order. The table also indicates that the aperture is located between surfaces S4 and S6, and is located at the reflective surface. Surface S10 corresponds to a cover glass on the CCD array.

TABLE 2

| SRF | RADIUS | THICKNESS | MATERIAL | Nd | V |
|---|---|---|---|---|---|
| OBJ | | 43.9605 | AIR | | |
| S1 | 11.06499 | 3.1230 | LLF6 | 1.53172 | 48.76 |
| S2 | −50.04128 | 0.3793 | AIR | | |
| S3 | −12.45649 | 0.75 | SF2 | 1.64769 | 33.85 |
| ST, S4 | −105.641 | −0.75 | REFL, SF2 | 1.64769 | 33.85 |
| S5 | 12.45649 | −0.3793 | AIR | | |
| S6 | −50.04128 | −3.1230 | LF6 | 1.53172 | 48.76 |
| S7 | −11.06499 | −37.44111 | AIR | | |
| S8 | | −0.700000 | S-NSL5 (O'Hara)* | 1.5249 | 59.8 |
| S9 | | −1.090000 | AIR | | |

*LENS DATA

Figure 10A:
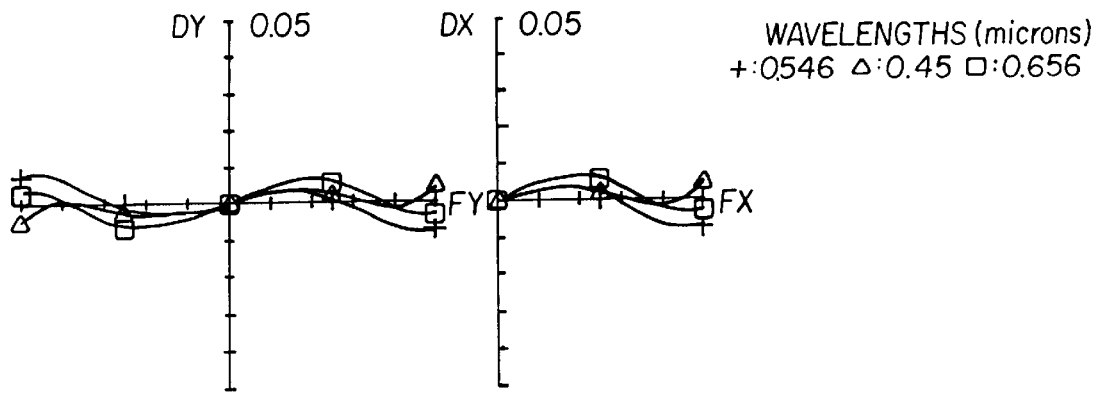
FIGS. 10A–10C are plots of ray intercept curves of the imaging lens of FIG. 9B.
Figure 10B:
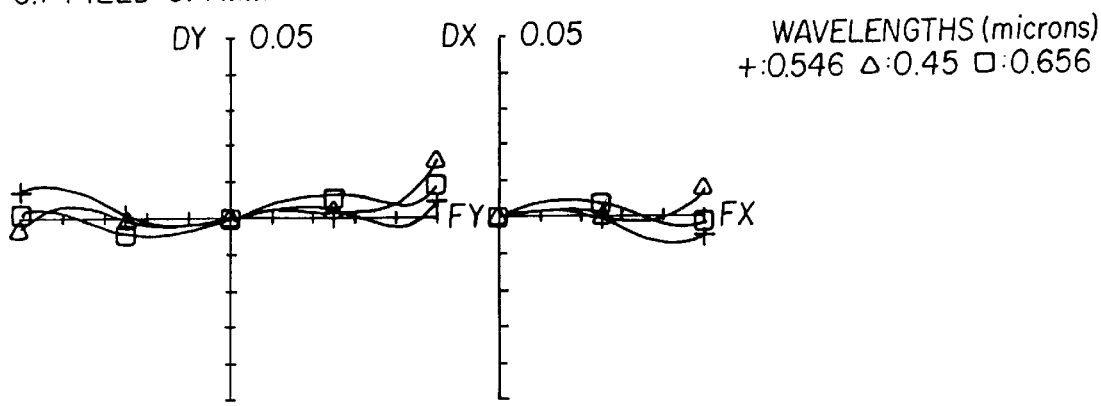
Figure 10C:
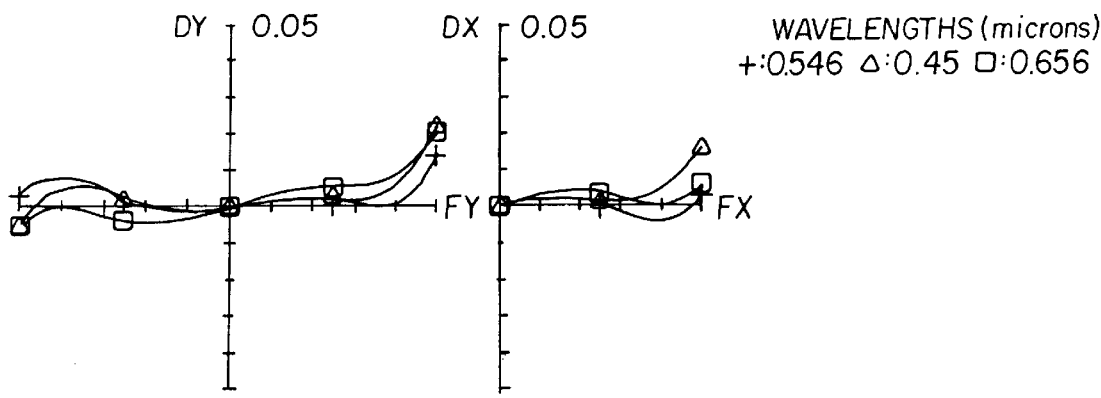
Figure 11:
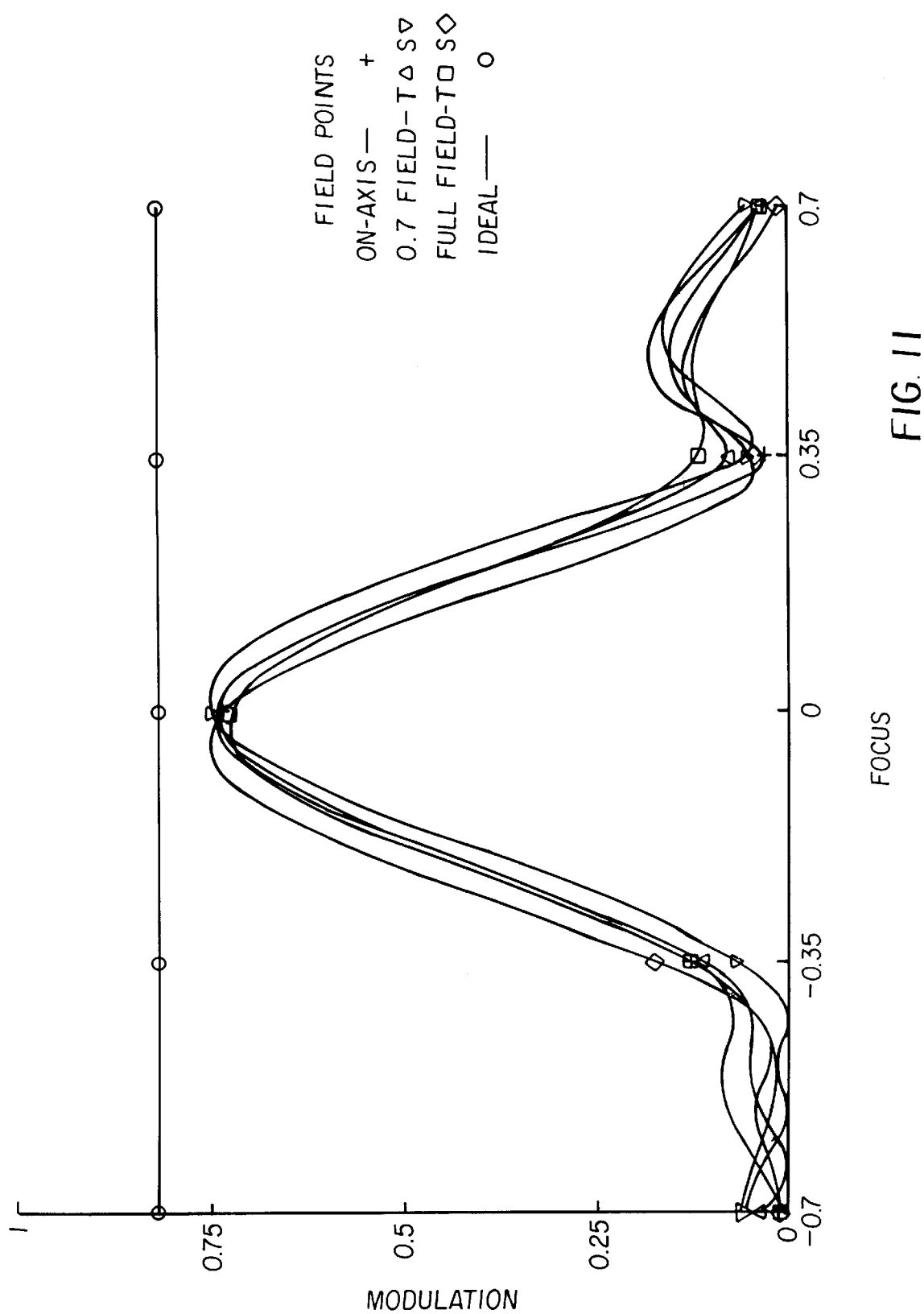
FIG. 11 is a plot of through focus polychromatic MTF, at 31 cycles per mm, of the imaging lens of FIG. 9B.
Figure 12A:
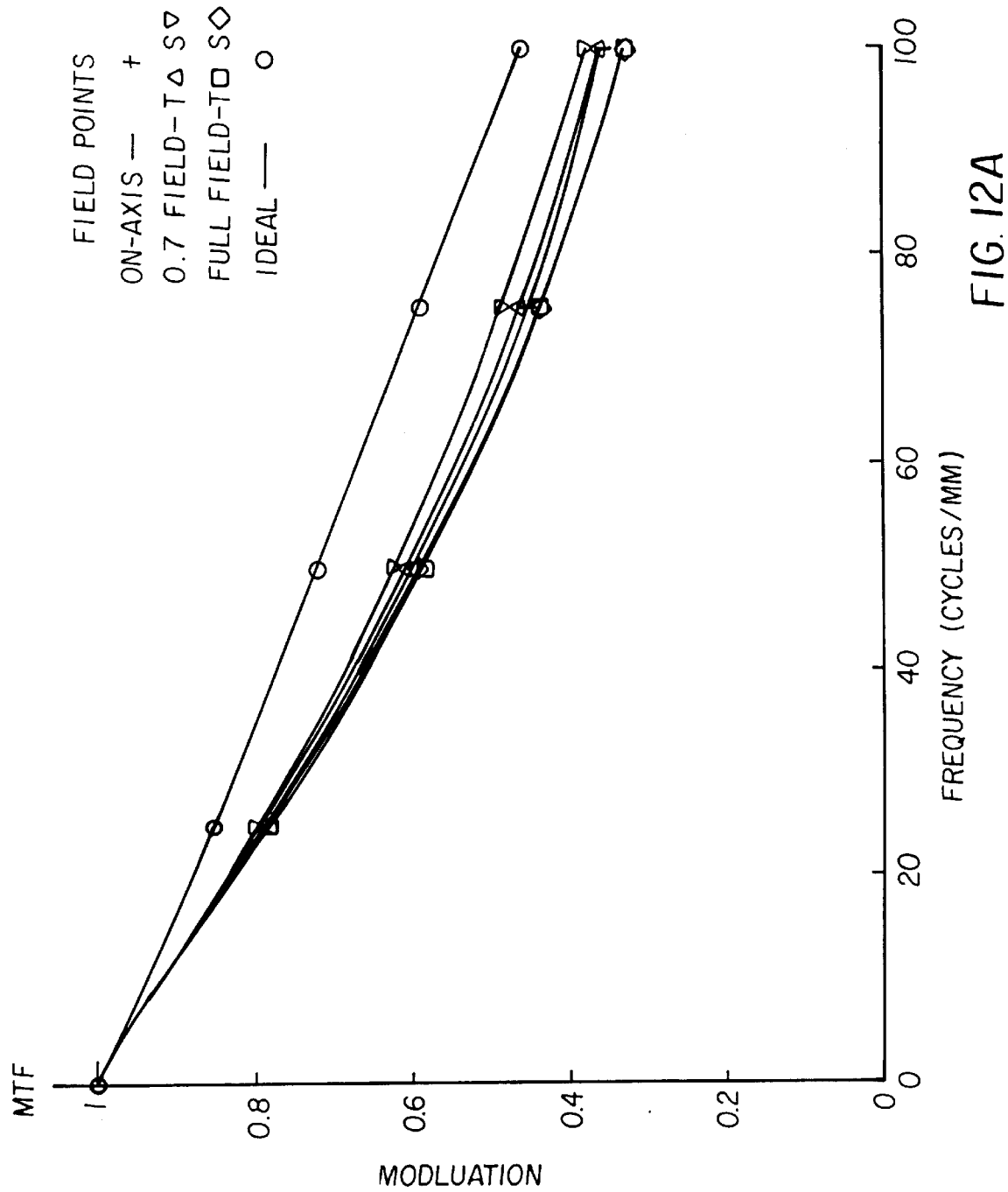
FIG. 12A is a plot of the polychromatic MTF of the imaging lens of FIG. 9B at 0%, 70%, and 100% of full field in both sagittal and tangential planes.
Figure 12B:
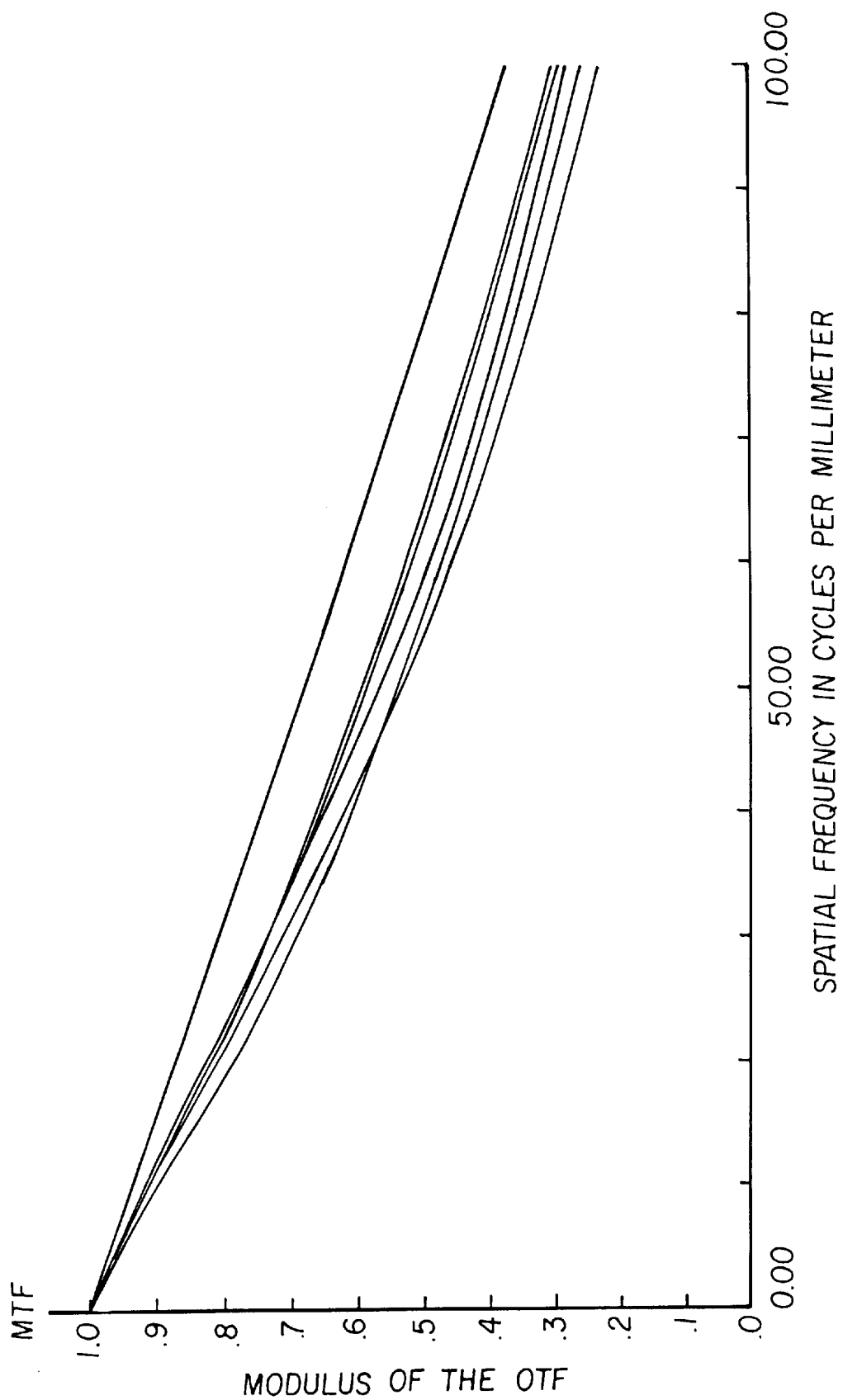
FIG. 12B is a plot of the polychromatic MTF of the imaging lens of FIG. 9C.

The imaging lens 25 is located approximately two focal lengths away from the object plane 3, such that the absolute value of the lateral magnification of the imaging system 20 is approximately unity ($|M|\cong 1$). Acceptable departure from unity magnification is dictated by the image quality required by the imaging application. It is preferable that the absolute value of the magnification M be $0.6<|M|<1.4$. It is even more preferable that $0.8<|M|<1.2$. It is most preferable that $0.9<|M|<1.1$. Maintaining a magnification near unity assures that coma, lateral color and distortion aberrations of the imaging lens 25 are reduced or eliminated. The larger is the departure from the unity magnification, the harder it is to control these aberrations. The aberration curves illustrating the performance of the retroreflective lens of FIG. 9B are provided in FIGS. 10A to 10F. More specifically, FIGS. 10A–10C depict rim ray intercept curves for blue, green and red light at several relative field (of view) positions. FIG. 10A corresponds to axis, FIG. 10B corresponds to 0.7 field and FIG. 10C corresponds to full field. The vertical axis depicts aberrations in millimeters. The horizontal axis is relative pupil coordinates the edges being ±full pupil (i.e., ±1.0 pupil). FIG. 10D depicts the field curvature in the sagittal (S) and tangential (T) fields. FIG. 10E depicts percent distortion at the primary wavelength (546.1 mm across the field). FIG. 10F depicts primary (P) and secondary (S') lateral color (440–650 nm/across the field). FIG. 11 depicts heterochromatic through focus MTF of the imaging lens of FIG. 9B (modulation transfer function) at the frequency of 31 cycles/mm at three field points: axis, 0.7 relative field, and fall field. Wavelengths used were 450 nm, 546 nm and 656 nm with respect to chromatic weights of 1, 1, 1. FIG. 12A is a plot of the polychromatic MTF of the imaging lens of FIG. 9B at 0%, 70%, and 100% of full field of view in both sagittal (S) and tangential (T) planes. As FIG. 12A shows, the MTF value of about 0.5 occurs at 70 cycles/mm at the image plane. Thus, the frequencies transferred from the object plane to the image plane can be as high as 120 cycles/mm (magnification times twice the nyguist frequency, or 0.9×2×70 cycles/mm). Therefore, the retroreflective lens provides resolution sufficient for scanning film and similar documents. FIG. 12B is a plot of the polychromatic MTF of the imaging lens of FIG. 9C at 0%, 70% and 100% of full field of view in both sagittal (S) and tangential (T) planes.

Figure 13A:
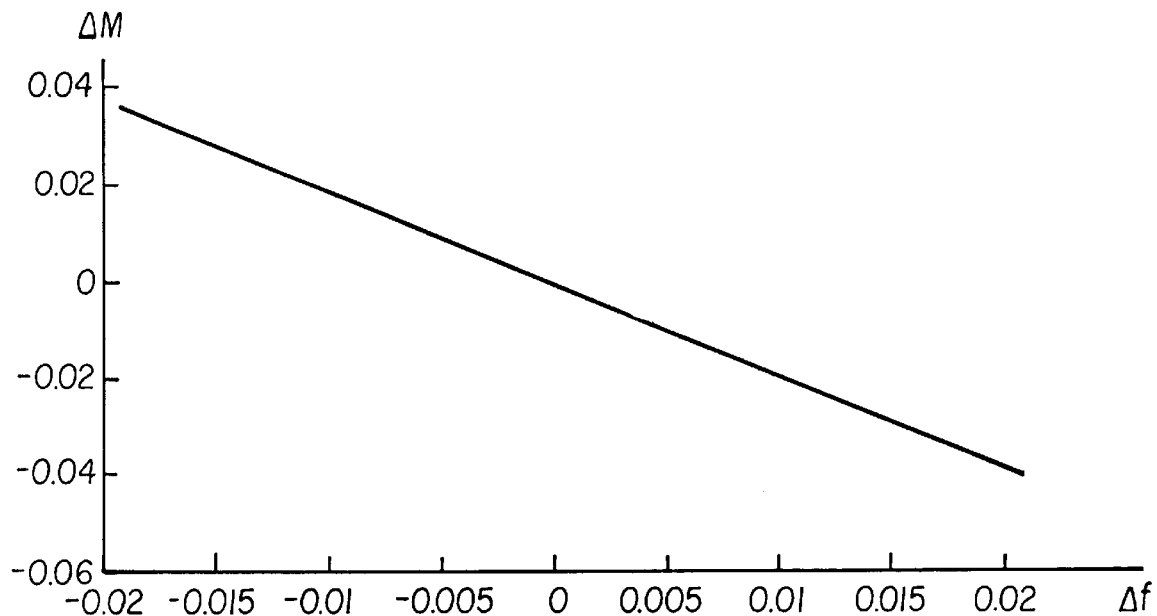
FIG. 13A is a graph of a fractional focal length change vs. fractional magnification change in a document scanner imaging system that utilizes a single-pass lens.

An imaging system (of a document scanner) was modeled with a fixed position, single-pass imaging lens and effects of the focal length deviation from its predetermined value on the imaging system magnification M were analyzed. A fractional focal length change Δf was defined as Δf=(fa/fd)−1, where fa is the actual focal length of the manufactured imaging lens and fd is the predetermined (i.e., design) value of the focal length. A fractional magnification change ΔM was defined as ΔM=1−Ma/Mp=1−(fa/(d−fa))/Mp, where Ma is the actual magnification, Mp is the predetermined (i.e., desired) magnification, and d is an object distance of the imaging lens. The results were plotted in FIG. 13A. As can be seen from this figure, a fractional focal lens change of |Δf|=0.2 results in the fractional magnification change ΔM of 0.04.

Figure 13B:
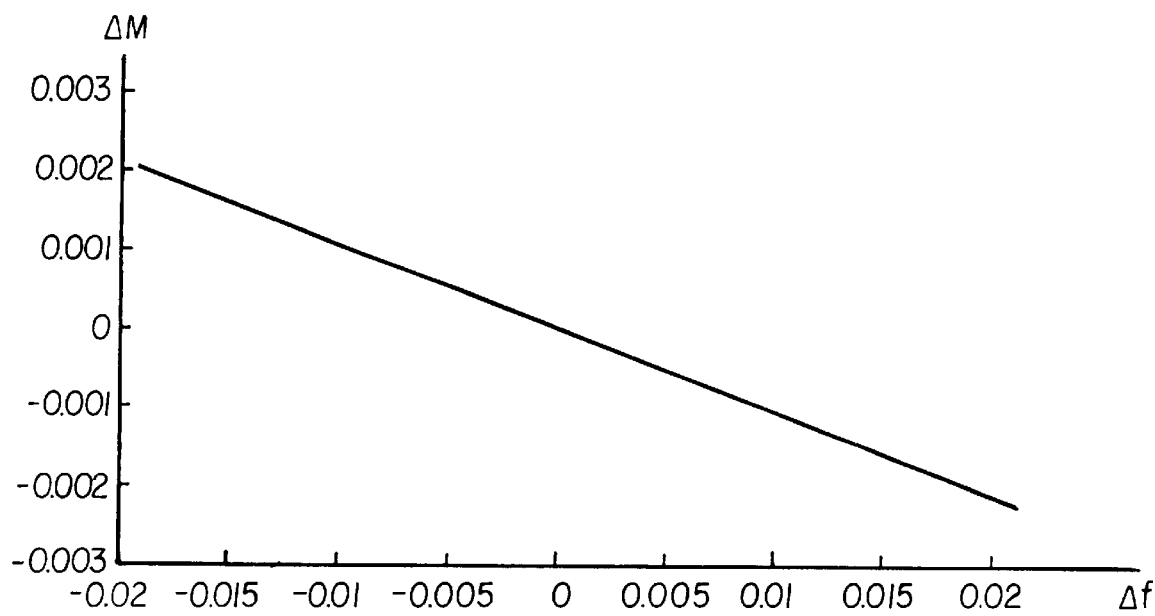
FIG. 13B is a graph of a fractional focal length change vs. fractional magnification in a document scanner imaging system that utilizes a retroreflective lens.

An imaging system with a fixed position retroreflective imaging lens of the same focal length (22.4 mm) was modeled and effects of the focal length deviation from its predetermined value on the imaging system magnification M were again analyzed. The results are provided in FIG. 13B. I was surprised to discover that that the magnification of this imaging system is very insensitive to the focal length deviations. More specifically, a fractional focal length change of |Δf|=0.2 results in the fractional magnification change ΔM of 0.002. This is a factor of 20 smaller than the corresponding change of single pass system. Thus, I realized that if a retroreflective imaging lens 25 is used in a document scanner, one does not need to do a magnification adjustment of the imaging system 20, because even if the focal length of the retroreflective imaging lens 25 deviates somewhat from its design value, the magnification change of the imaging system is insignificant (i.e., it will be well within the acceptable tolerance limits). Therefore, the assembly of the imaging system of the document scanner that utilizes a fixed position retroreflective imaging lens can be done faster and is less expensive then the assembly of an imaging system that utilizes a fixed position single-pass imaging lens. In addition, a retroreflective lens utilizes only half the number of the lens components utilized in a single-pass imaging lens of equivalent optical performance, making the production of the retroreflective lens less expensive. Finally, because the imaging system that utilizes a retroreflective imaging lens fits into a smaller spatial envelope, imaging system 20 can be enclosed in a much smaller housing than the similar imaging system that utilizes a single-pass lens. A smaller housing is more structurally rigid than a similar larger housing. Thus, the use of a retroreflective imaging lens 25 in an imaging system 20 results in a more rigid housing and a more stable optical performance.

In addition, in order to provide a high resolution (50–200 cycles/mm) it is preferable to have a retroreflective lens with the low F-number (F/#) of $3 \leq F/\# < 8$. It is even more preferable that $3.5 \leq F/\# < 6$. It is most preferable that $4 \leq F/\# \leq 5$. If the lower limit is exceeded the optical aberrations of the retroreflective lens are difficult to correct with only two lens components. Although a retroreflective lens can have more than two lens components, it increases the cost of the document scanner. If the upper limit is exceeded, the resolution of the retroreflective lens begins to deteriorate and the retroreflective lens is less capable of operating with a weak illumination source. In the above embodiment the retroreflective lens has an F-number of F/4.4.26.

Baffles

Figure 14:
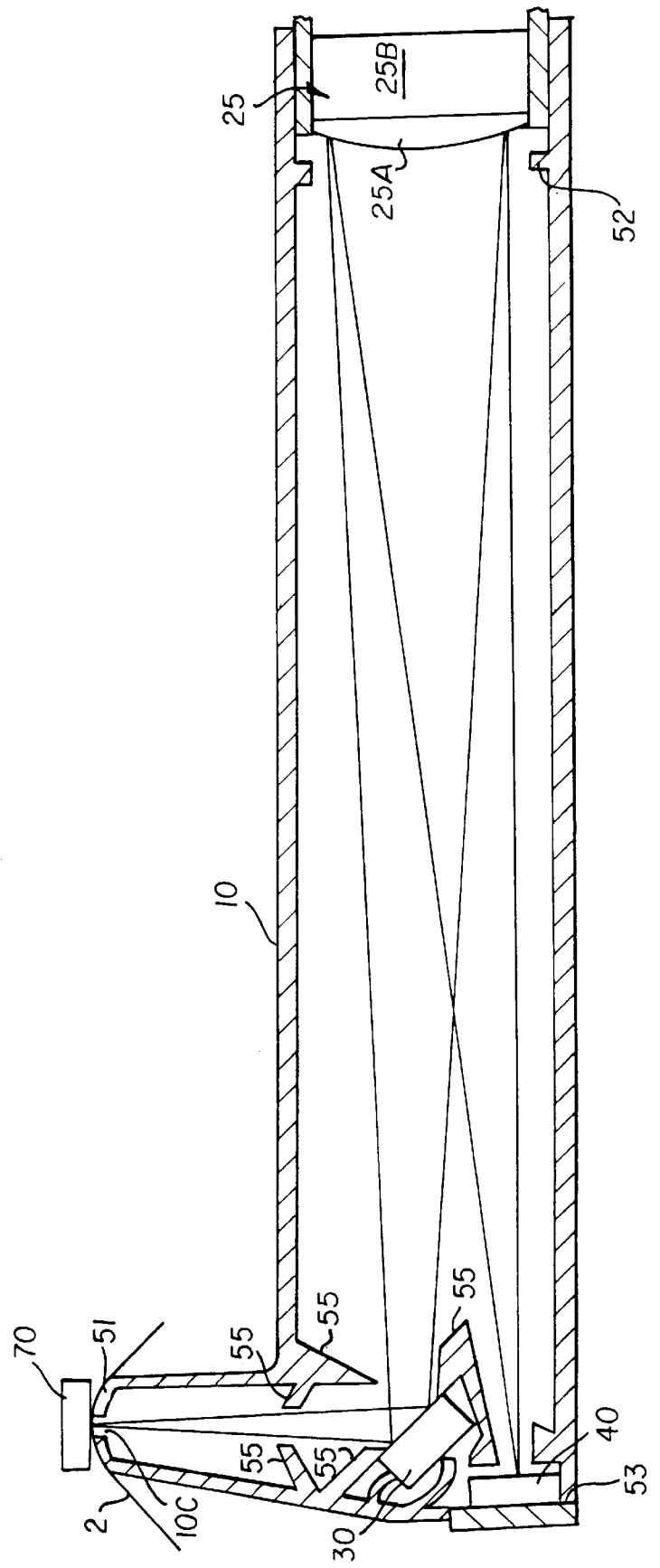
FIG. 14 illustrates a cross-section of a housing, including a plurality of positioning features and a plurality of baffles for shielding the CCD from spurious light.

If diffuse light is used to illuminate the document 2, the light emanating from the document plane will spread and some of the light will not enter the imaging lens 25. Some of the light which does not enter the imaging lens will reflect off the components of the imaging system and may impinge on the CCD 40, contributing to noise and deteriorating the image quality. This light is called spurious light. This spurious light reduces the contrast of the captured image. It is necessary, therefore, to minimize the amount of spurious light incident upon the CCD. This is accomplished, for instance, with the use of light absorptive baffles 55 (depicted in FIG. 14) within the housing 10 to trap spurious light before it can find its way to the CCD 40. The placement of these baffles 55 is dependent on the specific geometric configuration of the imaging system. It is preferred to place the entire imaging system (from the object plane to the CCD 40) in a light absorptive housing. (See FIGS. 14 and 15A) This ensures that no light from extraneous sources impinges on the CCD 40.

The Housing

The housing 10 is made of two parts 10A and 10B and has a slit 10C for admitting light that illuminated the document 2 into the housing 10. After the imaging lens 25 and the CCD 40 are fixedly placed into one of the housing parts, the other housing part is attached to the first housing part to enclose the imaging system 20. The housing 10 also has one or more apertures 10D, 10E. (See FIGS. 15A–C). The function of these apertures will be discussed later in the specification.

The housing 10 provides positioning features 51, 52 and 53 to precisely position the document 2 relative to the imaging lens 25, and to precisely position the CCD relative to the imaging lens 25. (See FIGS. 15A–15C and 16A–16E). This housing 10, including the positioning features 51, 52 and 53, is preferably fabricated of molded plastic to decrease the cost of the housing and to enable the positioning features 51, 52 and 53 to be molded into the housing 10. Additionally, the housing 10 can readily be molded with flanges 75 that enable it to be mounted to a base 80 that also mounts other subassemblies of the document scanner (for example, electronics, mechanical components for transport of the document). It is therefore desirable to make the housing 10 as rigid as possible to retain the position of the positioning features 51–53 and thus the document, imaging lens, and CCD, despite stress induced by the base 80, and despite the changes due to heat and humidity. Rigidity of the housing 10 is aided by minimizing the physical size of the housing (relative to the thickness of the wall of the housing 10), as well as by making the housing as monolithic as possible. The housing 10 of FIG. 1SA has a length of only about 40 mm.

As stated above, the positioning features 51, 52, 53 are used to define the position of the key components (document 2, CCD 40, imaging lens 25,). These positioning features 51–53 may be molded into the housing 10, thereby fixing the relative positions of these components to a common, stable structure. Their description is summarized as follows.

Figure 15A:
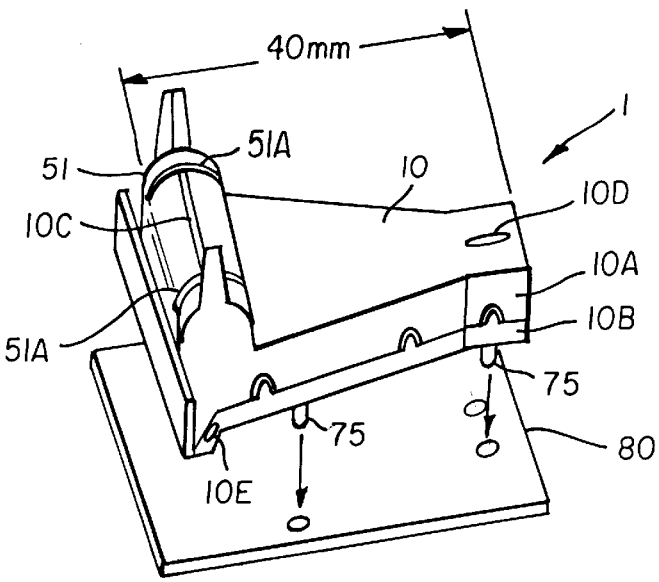
FIG. 15A is an external, perspective view of the housing of FIG. 14 and a base for supporting the housing.
Figure 15B:
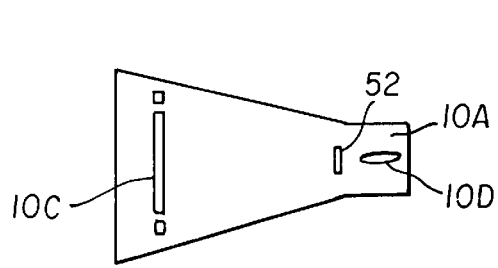
FIG. 15B is an interior view of the housing part 10A shown in FIG. 15A.
Figure 16A:
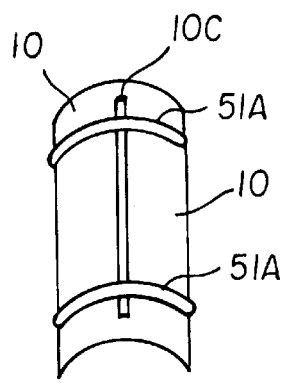
FIG. 16A is a perspective view of a portion of the housing with the document positioning fixture in a form of two rails.
Figure 16B:
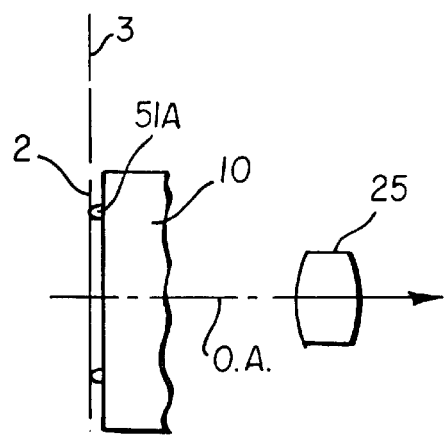
FIG. 16B is side view of a portion of the housing shown in FIG. 16A.

Positioning feature 51 is used to hold the document 2 in its correct location relative to the imaging system 20. This feature is shown in FIGS. 15A, 16A and 16B.

The positioning feature 52 permits some axial motion of the imaging lens 25 to accomplish a combination of magnification adjustment and focus adjustment. The positioning feature 52 may also allow the imaging lens to tilt if center adjustment of the image on the CCD is to be accomplished through lens positioning. After the imaging lens 25 is properly positioned inside the housing, it is fixed in this position.

The positioning feature 53 includes mounts for the CCD 40 that permit adjustment of the CCD 40 in all three translational axes as well as rotational movement. This is done to achieve focus control, and to attain i) coincidence of the center of the image with the center of the CCD, ii) rotation about the optical axis to remove image skew from the image, and iii) rotation about the page scan axis of the CCD to compensate for image plane tilt error present in the imaging lens 25. The detail description of the positioning features 51–53 is as follows.

I. Positioning Feature 51

Figure 16C:
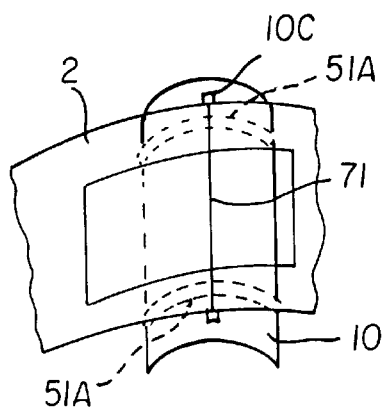
FIG. 16C illustrates a portion of the housing shown in FIG. 16A and an illuminated document.
Figure 16D:
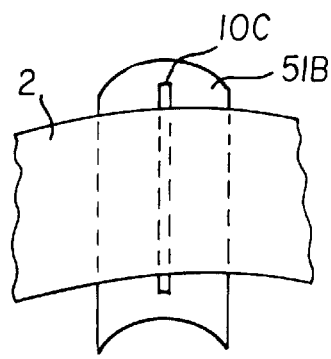
FIG. 16D illustrates an alternative embodiment of the document positioning fixture.

The document 2, though being required to advance relative to the illumination system 70 and the imaging system 20, can be referenced to the imaging system 20 with the positioning features 51 of the housing 10 such that a portion of the document 2 is forced to lie perpendicular to the imaging lens' axis) OA, intercepting the object plane 3. (See FIGS. 16A, 16B, 16C). A preferred method of accomplishing this is to mold two rails 51A into the housing 10. These rails 51A are preferably placed outside the portion of the document 2 that is being imaged but such that the document rests on the rails 51A. The rails 51A are oriented so that the length of the rail coincides with the direction of document motion. The rail is preferably curved (convex) in the direction of document motion. If the document is forced into contact with these curved rails 51A (by tension or other means) such that it is slightly curled in the direction of its motion, the document 2 will be forced to be straight in the perpendicular direction. (FIG. 16B). That is, the document assumes a cylindrical shape in the region of the rails 51A. (FIG. 16C). Thus, the document 2 is forced to lie precisely in the curved plane defined by the curved rails 51A. The portion of the document being scanned therefore lies in a straight line 71 which is located in the front of the imaging lens 25, preferably about two focal lengths away.

The specific characteristics of the rails 51A are determined by the mechanical characteristics of the document, the wear and mechanical characteristics of the material of which the rails are made, and the force with which the document contacts the rails. The force required to contact the document to the rails is preferably generated by tensioning the document in the direction of document advance. A curved (cylindrical) surface 51B, 51B' may be used instead of the rails 51A to support the document 2. (See FIGS. 16D, 16E). Nevertheless curved rails are preferable to a similarly curved surface because such a surface will tend to scuff the image portion of the document and risk generating visual artifacts (such as scuff marks, scratches, or marks) that the rails are able to avoid or minimize. However, either such surface or rails will force a document 2 to form a straight line in a direction perpendicular to the curvature.

Figure 16E:
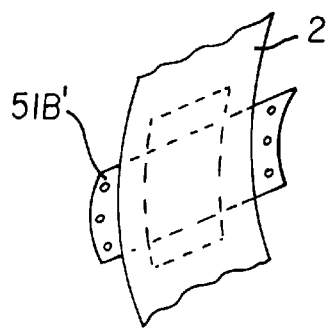
FIG. 16E illustrates another alternative embodiment of the document positioning fixture.

It is preferred that the rails 51A be placed outside of the scanned region of the document to avoid producing visual artifacts in the critical area of the document. (See FIG. 16C). However, the rails should be placed as close together as possible to avoid buckling of the document into the void between the rails due to the tensioning of the document. The radius of curvature should be minimized within the constraints of the housing dimensions, since this will maximize the resistance to buckling of the document between the rails. For similar reasons, the rails 51A should not contain sudden changes in the radius of curvature (ideally they should be continuous curves), and they should be configured such that the ends of the rail are tangent to the tensioned document (FIGS. 16B, 16C). In the example illustrated in FIG. 16A, the length of the rails 51A is 10 mm, the width of the rails is about 1.5 mm, and the radius of curvature of the rails is about 25 mm. The rails 51A are separated from each other by approximately 18 mm (for APS format film, center to center distance). Distances would be different for different film formats. For example, for a 35 mm format, the distance would be larger. In the preferred embodiment, the rails are an integral part and molded with the rest of the housing. This reduces the number of parts required in the assembly and the variability associated with those parts. This also allows for the alignment of the imaging lens relative to the rails. Therefore critical alignment of the imaging system to a separate film track is not necessary. Fairly loose manufacturing tolerances, i.e. greater than 0.005", can be used for the assembly of the imaging system to the film track. Positioning feature 51 should be preferably constructed as concave or convex support for the document 2 (see FIGS. 16D, 16E), and may be configured as rails 51A or as a pressurized air shoe with air bleeder holes providing a moving air flow (FIG. 16E). Thus, the air shoe provides a moving air flow upon which the document floats, maintaining a consistent distance above the pressure shoe.

II. Positioning Feature 52

The housing 10 also serves to stabilize the imaging lens 25 in such a way as to permit only axial motion (along the optical axis) of the imaging lens 25, thereby enabling compensation for manufacturing variations in focal length without lateral shift (i.e., a shift perpendicular to the line connecting the center of the document 2 and the center of the CCD 40) of the imaging lens 25. This is preferably accomplished by mounting the retroreflective lens 25 in a lens barrel 90 that is approximately 1.5× longer than its diameter D, and forming a bore 52A in the molded housing 10, such that the bore 52A is very slightly oversized (by approximately 1% of the lens barrel diameter) for this barrel. (See FIG. 17). It is preferred that at least three spring-loaded plungers (such as fingers 52B) contact the lens barrel 90 during alignment to ensure that the barrel makes stable line contact with the bore during axial adjustment. This ensures that the optical axis of the imaging system 25 is not altered during the focus adjustment step of the imaging system assembly. When final focus adjustment is achieved, the lens barrel may be firmly locked in place in the bore 52A (for example, by epoxy, mechanical fasteners, etc.), so that the fingers 52B may be no longer needed.

Figure 15C:
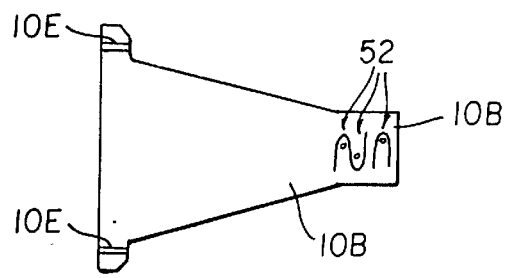
FIG. 15C is an interior view of the housing part 10B shown in FIG. 15A.
Figure 17:
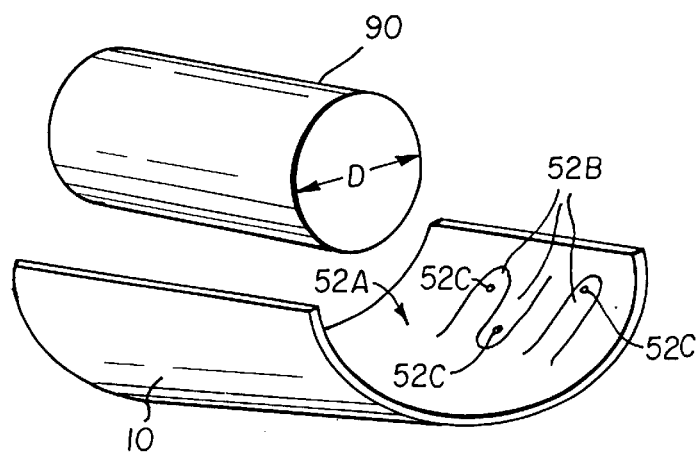
FIG. 17 illustrates a lens barrel, a housing section having a bore for receiving the lens barrel and fingers for holding the lens barrel.

Alternatively, the plungers (such as spring fingers 52B) could be made of a material which, under load, maintain the contact pressure on the lens barrel 90 for the life of the imaging system (for example, insert molded steel fingers). In this case, no other locking mechanism is needed to secure the lens barrel in place. It is preferred to construct the spring-loaded plungers by molding "fingers" 52B into the wall of the housing 10. Such finger are depicted in FIGS. 15C and 17. If these fingers 52B are molded with a pad 52C protruding into the bore 52A such that the pad 52C interferes with the outside diameter of the lens barrel 90), the fingers 52B will flex and exert a force upon the lens barrel such that the lens barrel is forced against the opposite surface of the bore 52A. The height of the pad 52C is determined by the mechanical characteristics of the molded housing material utilized, as well as the dimensions of the fingers and surface finish. In order to avoid catastrophic failure during assembly of the imaging system 20, care should be taken to design the size and shape of the spring finger 52B such that the stress induced by the bending of the finger is well below the yield point of the material. In other words, the height of the pad coupled with the length, width, and thickness of the spring finger determine the stress induced during assembly as well as the ability to hold the lens barrel in place. In the preferred embodiment, the material for housing 10, fingers 52B, and pads 52C is glass-filled polycarbonate. Furthermore, the higher the glass loading the more stable the imaging system becomes throughout the environmental changes. In the preferred embodiment, the material is a 30% glass filled polycarbonate. Moreover, if multiple fingers 52B with protruding pads 52C are utilized and arranged such that two protruding pads define a line parallel to the bore axis, and another finger exerts force at a point on the lens barrel 90 not on that line, the cylindrical lens barrel 90 is captured between two parallel lines and a single point. This condition is inherently stable, and the lens barrel 90 will not move perpendicular to the bore axis. The lens barrel 90 will slide axially maintaining contact with the two parallel lines, which are also parallel to the optical axis.

III. Positioning Feature 53

Figure 18A:
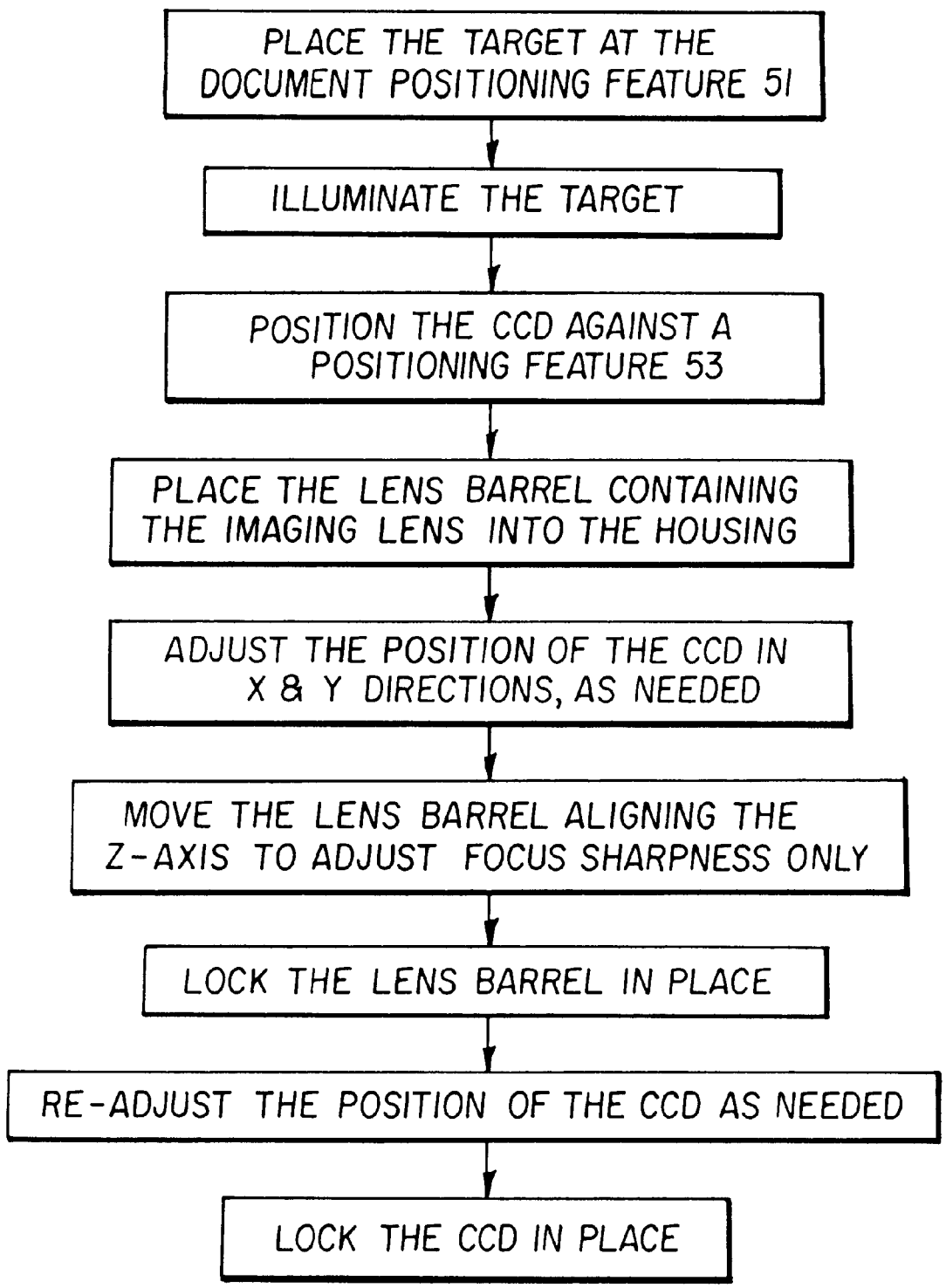
FIG. 18A is a flow chart depicting a procedure for the alignment of the imaging system.

The housing 10 may also provide a positioning feature, such as a reference surface 53A to locate the CCD. The number of constraints embodied in the positioning feature 53 to hold the CCD 40 in its precise location is determined by the degree to which the tolerances of the CCD 40 match the imaging system requirements. For instance, a particular CCD 40 may be manufactured to very tight mechanical tolerances permitting adequate optical alignment of the CCD 40 by referencing the CCD mechanical package to the mechanical references 53B of the positioning feature 53 of the housing 10. Alternatively CCDs may be manufactured with such loose mechanical tolerances that each of those CCDs must be optically aligned to the rest of the imaging system during assembly. This may be accomplished according to the procedure illustrated in FIG. 18A which is described below.

Alignment Procedure

Figure 18B:
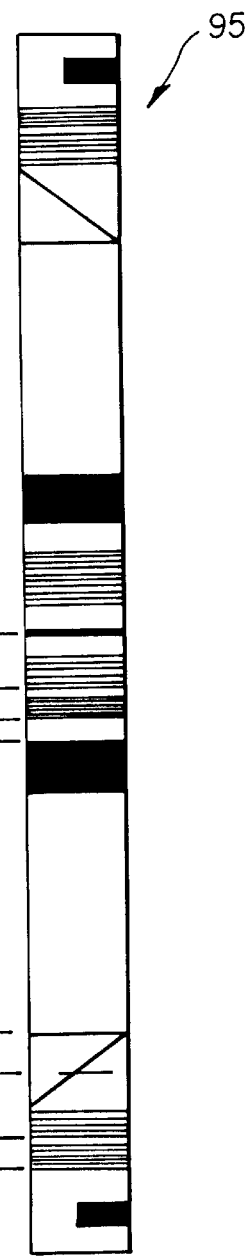
FIG. 18B illustrates a target for alignment of the imaging system.

The intent of the following procedure is to image a target 95 with the imaging system 20 onto a predetermined location on the CCD 40. An example of such a target is illustrated in FIG. 18B. This target enables a consistent criterion for alignment of the imaging system. In order to accomplish this task, it is necessary to design a target that will be used in place of the document (such as film or paper). The design of the target should take into account the magnification at which the imaging system will be working, so that very precise measurements can be made during the alignment process. The target must be of much higher optical quality than the imaging system, so that any degradation of the image will be immediately apparent. Furthermore, the target must be dimensionally stable, so that humidity and temperature have little or no effect on the dimensions of the pattern. The target should, as a minimum, possess an identifiable pattern or feature at the precise center of the illuminated document plane, and should provide sufficient numbers of sharp edged patterns (square wave patterns, for example) through out the field of view so that the best composite focus position may be determined, despite the presence of lens field curvature. This stability and precision can be attained, for instance, with a chrome target printed on a glass substrate.

The following are detailed steps of an alignment procedure:

1. Procure an appropriate (transmissive or reflective) target 95 that at least fills the illuminated object plane 3. The target 95 should have an identifiable pattern or feature that is positioned at the optical axis of the imaging system 25. This pattern is the center indicator.

2. The target 95 should be placed at the object plane with the pattern registered against the curved rails 51A or on a similar positioning feature.

3. Illuminate the target 95 with a suitable illumination source. This illumination source should have the same characteristics as the actual illumination source 70 used in the operational document scanner. The actual illumination source 70 that will be used in the assembled document scanner may be used for alignment purposes.

4. Procure a suitable CCD 40. The CCD 40 must be operational, and capable of delivering image data to a display or to a computer for analysis.

5. Position the CCD against the "z-axis" reference surface (positioning feature 53) using a manipulation mechanism. This manipulation mechanism should be also able to precisely: i) position the CCD in x and y directions, and ii) tilt the CCD by angles $\theta_z$ and $\theta_y$ (where $\theta_z$ is angle of rotation about the z axis and $\theta_y$ is the angle of rotation about the y axis).

The z axis corresponds to the optical axis of the imaging system, the x and y axes are defined as the axes perpendicular to the z axis and are mutually orthogonal. The x axis is perpendicular to the direction of document advance (scan direction), and the y axis is parallel to the direction of document advance (cross scan direction). The z axis reference surface is a physical surface on the housing 10 that fixes the location of the CCD 40 along the optical axis of the imaging system, but allows freedom of CCD translation in x, and y directions, and tilt in $\theta_z$.

6. Place the imaging lens 25 into the lens barrel 90. Insert the lens barrel 90 into the bore 52A of the housing 10 using a manipulation mechanism permitting precise positioning of the lens barrel in the z direction. Such a manipulation mechanism may be a moving pin inserted through a small aperture or slot 10D provided in a housing 10. (See FIGS. 15A, 15B).

7. Adjust (if necessary) the position of the CCD by translating the CCD in the x and y directions and using the signals derived from the active CCD 40. These signals will identify the position of the target image on the CCD 40. This may be done by a manipulation mechanism that is holding a circuit board 97 which is attached to a CCD 40.

8. Re-adjust the z position of the imaging lens 25 to optimize the sharpness of the image. Ensure that the imaging lens 25 is located such that the CCD 40 is located at the median position of the depth of focus. Lock the lens and barrel assembly 92 into position.

9. Re-adjust (if necessary) the CCD position in x direction until the image of the center indicator falls on the desired CCD element. Usually, the desired CCD element is the center element of the CCD array.

10. Re-adjust (if necessary) the CCD position in y direction until the image of the center indicator falls on the CCD array.

11. Re-adjust (if necessary) the CCD position in $\theta_z$, about the optical axis, until the CCD is properly aligned (angularly) to the target.

12. Adjust (if necessary) the CCD position by tilting it by the angle $\theta_y$ to minimize the effect of the field tilt (introduced by the imaging lens) along the length of the CCD.

Figure 19:
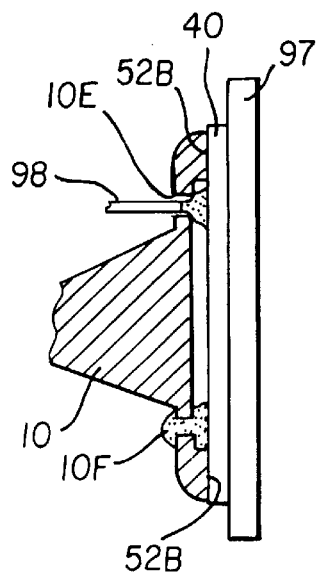
FIG. 19 illustrates a section of the housing attached to the CCD.

13. Lock the CCD permanently into this position. A preferred method of fixing the CCD to the housing 10 after performing precision adjustment is using an ultraviolet (UV) curing adhesive. Viscous rivets 10F of this adhesive are formed by dispensing adhesive directly onto a surface of the CCD by an applicator, and continuing the dispensation as the applicator (such as a hypodermic needle 98) is slowly withdrawn through the aperture 10E in the housing 10. (See FIG. 19). The rate of flow of adhesive and the rate of applicator withdrawal may be coordinated such that a rivet-shaped column of viscous adhesive contacts both parts. Ultraviolet exposure of the adhesive rivet 10F for several seconds will harden the adhesive and firmly lock the relative position of the CCD and housing 10. This is described in detail in patent application Ser. No. (Attorney Docket 77289FHB), entitled "ULTRAVIOLET CURABLE RIVETING OF PRECISION ALIGNED COMPONENTS".

The CCD captures an image of a document and generates an analog representation of the image information. After being converted into digital format, the image information is sent to an image receiver 100. Depending on the application this image information may or may not be modified and recorded to a variety of receivers. Such receivers may include paper, film, photosensitive drum, magnetic tape or digital file.

The invention has been described in detail with particular reference to certain preferred embodiments thereof, but it will be understood that variations and modifications can be effected within the spirit and scope of the invention.

PARTS LIST

| | |
|---|---|
| 1 | Document scanner |
| 2 | Document |
| 3 | Object Plane |
| 5 | Image plane |
| 10 | Housing |
| 10A | First housing part |
| 10B | Second housing part |
| 10C | Slit in the housing |
| 10D | Aperture |
| 10E | Aperture |
| 10F | Rivet |
| 20 | Imaging System |
| 25 | Imaging Lens |
| 25A | First Lens Element |
| 25B | Second Lens Element |
| 25C | Reflective surface |
| ST | Aperture Stop |
| 30 | Folding Mirror |
| 40 | CCD |
| 51 | Positioning fixture |
| 51A | Rails |
| 51B | Curved cylindrical surface (convex) |
| 51B' | Curved cylindrical surface (concave) |
| 52 | Positioning fixture |
| 52A | Bore |
| 52B | Fingers |
| 52C | Pads |
| 53 | Positioning fixture |
| 53A | Reference surface |
| 55 | Baffle |
| 60 | Analog to Digital converter |
| 70 | Illumination System |
| 71 | Illumination line |
| 75 | Flange |
| 80 | Base |
| 90 | Lens Barrel |
| 95 | Target |
| 97 | Circuit board |
| 98 | Applicator |
| 100 | Receiver |

What is claimed is:

1. A document scanner comprising:

(I) a document support for supporting a document in position to be scanned;

(II) an illumination system located adjacent to the document support for illuminating at least a portion of a supported document, said illumination system providing less than 1 watt of power;

(III) a photosensitive medium for capturing an image of the document and generating image information;

(IV) a retroreflective lens having an infinity F-number between F/3 and F/8, said retroreflective lens comprising at least one lens element with optical power and a reflective surface, and being positioned to (i) receive light emanating from the supported document propagated in a first direction, through at least one lens element of said retroreflective lens, (ii) reflect said light off said reflective surface in a second direction and (iii) propagate said light through the retroreflective lens in said second direction, towards said photosensitive medium, the document support, the photosensitive medium, and the retroreflective lens are in a fixed spatial relationship relative to one another and said document support and said photosensitive medium are being separated by a distance d which is less than 45 mm.

2. A document scanner according to claim 1 wherein said document scanner has a resolution of more than 50 cycles/mm.

3. A document scanner according to claim 1 wherein said illumination system provides less than 0.5 watt of power.

4. A document scanner according to claim 1 wherein said retroreflective lens has an aperture stop located in a vicinity of said reflective surface.

5. A document scanner according to claim 1 wherein said photosensitive medium is a CCD.

6. A document scanner according to claim 1 wherein said retroreflective lens has a focal length and wherein a fractional focal length change Δf will result in a fractional change of magnification ΔM such that |ΔM|<|Δf|.

7. A document scanner according to claim 6 wherein |ΔM|<0.2|Δf|.

8. A document scanner according to claim 1 wherein said retroreflective lens is adapted to image the document at a magnification M, where 0.6≦|M|≦1.4.

9. A document scanner according to claim 8 wherein 0.8≦|M|≦1.2.

10. A document scanner according to claim 9 wherein 0.9≦|M|≦1.1.

11. A document scanner comprising:
(I) a document support for supporting a document in position to be scanned, said document support includes two curved rails;
(II) an illumination system located adjacent to the document support for illuminating at least a portion of a supported document;
(III) a photosensitive medium for capturing an image of the document and generating image information;
(IV) a retroreflective lens, said retroreflective lens comprising at least one lens element with optical power and a reflective surface, and being positioned to (i) receive light emanating from the supported document propagated in a first direction, through at least one lens element of said retroreflective lens, (ii) reflect said light off said reflective surface in a second direction and (iii) propagate said light through the retroreflective lens in said second direction, towards said photosensitive medium; wherein the document support, the photosensitive medium, and the retroreflective lens are in a fixed spatial relationship relative to one another.

12. A document scanner comprising:
(I) a document support for supporting a document in position to be scanned;
(II) an illumination system located adjacent to the document support for illuminating at least a portion of a supported document, said illumination system providing less than 1 watt of power;
(III) a photosensitive medium for capturing an image of the document and generating image information;
(IV) a retroreflective lens having an infinity F-number between F/3 and F/8, said retroreflective lens comprising at least one lens element with optical power and a reflective surface, and being positioned to (i) receive light emanating from the supported document propagated in a first direction, through at least one lens element of said retroreflective lens, (ii) reflect said light off said reflective surface in a second direction and (iii) propagate said light through the retroreflective lens in said second direction, towards said photosensitive medium, the document support, the photosensitive medium, and the retroreflective lens are in a fixed spatial relationship relative to one another; and wherein said document support, and said reflective surface of said retroreflective lens are separated from one another by a distance which is less than 45 mm and said photosensitive medium and said reflective surface of said retroreflective lens are separated from one another by a distance which is less than 45 mm; and said document scanner has a resolution of more than 50 cycles/mm.

13. A document scanner according to claim 12, wherein said resolution is more than 65 cycles/mm.

14. A document scanner according to claim 12, wherein said document support includes two curved rails supporting said document.

* * * * *